(12) United States Patent
Kajiyama

(10) Patent No.: US 8,351,064 B2
(45) Date of Patent: Jan. 8, 2013

(54) IMAGE OUTPUT SETTING CONTROL SYSTEM, IMAGE OUTPUT SETTING CONTROL APPARATUS, IMAGE OUTPUT INSTRUCTION APPARATUS, MANAGEMENT SERVER, IMAGE OUTPUT APPARATUS, COMPUTER-READABLE MEDIUM AND COMPUTER DATA SIGNAL FOR DESIGNATING DIFFERENT OUTPUT CONDITIONS

(75) Inventor: Hajime Kajiyama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1065 days.

(21) Appl. No.: 12/330,166

(22) Filed: Dec. 8, 2008

(65) Prior Publication Data

US 2009/0273802 A1 Nov. 5, 2009

(30) Foreign Application Priority Data

May 2, 2008 (JP) ................................ 2008-120110

(51) Int. Cl.
*G06F 3/12* (2006.01)

(52) U.S. Cl. ......... 358/1.15; 358/1.1; 358/1.9; 358/1.13

(58) Field of Classification Search .................. 358/1.1, 358/1.9, 1.13, 1.15, 400, 401, 448, 468
See application file for complete search history.

(56) References Cited

U.S. PATENT DOCUMENTS

| | | | | |
|---|---|---|---|---|
| 6,606,165 B1 * | 8/2003 | Barry et al. | ..................... | 358/1.9 |
| 6,924,906 B1 * | 8/2005 | Schwier et al. | ................ | 358/1.6 |
| 7,079,272 B2 * | 7/2006 | Hatayama | ..................... | 358/1.15 |
| 2001/0048833 A1 | 12/2001 | Katsuda et al. | | |
| 2007/0165248 A1 | 7/2007 | Utsunomiya et al. | | |

FOREIGN PATENT DOCUMENTS

| | | |
|---|---|---|
| JP | 2001-344083 A | 12/2001 |
| JP | 2003-216384 A | 7/2003 |
| JP | 2007-213566 A | 8/2007 |

OTHER PUBLICATIONS

Notification of Reasons for Refusal dated May 10, 2010, in counterpart Japanese Application No. 2008-120110.

* cited by examiner

*Primary Examiner* — Thomas D Lee
(74) *Attorney, Agent, or Firm* — Sughrue Mion, PLLC

(57) ABSTRACT

An image output instruction apparatus includes an output condition reception section and an output instruction section. The output condition reception section receives, for each predetermined range of a document to be output, a setting of an output condition concerning an image output process. The output instruction section provides a first output instruction to a first image forming apparatus based on the output conditions for the respective predetermined ranges received by the output condition reception section.

3 Claims, 30 Drawing Sheets

Image output setting control system 2A (including image output instruction apparatus 2C; first exemplary embodiment)

FIG. 3A

<Format Example of Print Property Command Group>
Basic Example of First Exemplary Embodiment Image Output Instruction Apparatus 2C → Management Server 6

```
_%-12345X@PJL JOB MODE=PRINTER
@PJL SET JOBATTR="@LUNA=Administrator"
@PJL SET COPIES=1
@PJL SET PAGES=1-4                      ← Designation of pages
@PJL SET STAPLE=RIGHTDUAL               ← Staple two position on right side
@PJL SET RENDERMODE=GRAYSCALE           ← Black and white
_%-12345X@PJL JOB MODE=PRINTER
@PJL SET JOBATTR="@LUNA=Administrator"
@PJL SET COPIES=1
@PJL SET PAGES=5-9                      ← Designation of pages
@PJL SET JOBATTR="@FOLD=BIFOLDOUTSIDE"  ← Fold
@PJL SET RENDERMODE=COLOR               ← Color
```

FIG. 3B

<Format Example of Output Job>
Basic Example of First Exemplary Embodiment
Image Output Instruction Apparatus 2C → Management Server 6
  *ID + Print Data _%-12345X@PJL JOB MODE=PRINTER
@PJL SET ID=0x00001  ← ID
Data of 1st page
Data of 2nd page
Data of 3rd page
Data of 4th page
Data of 5th page
Data of 6th page
Data of 7th page
Data of 8th page
Data of 9th page

FIG. 3C

<Format Example of Output Job>
Basic Example of First Exemplary Embodiment
Management Server 6 → Image Output Apparatus 3X Data transmitted to MFP1
    _%-12345X@PJL JOB MODE=PRINTER
    @PJL SET JOBATTR="@LUNA=Administrator"
    @PJL SET COPIES=1
    @PJL SET PAGES=1-4     ← Designation of pages @PJL SET STAPLE=RIGHTDUAL     ← Staple two position on right side @PJL SET RENDERMODE=GRAYSCALE     ← Black and white Data of 1st page
    Data of 2nd page
    Data of 3rd page
    Data of 4th page

-----------

Data transmitted to MFP2
    _%-12345X@PJL JOB MODE=PRINTER
    @PJL SET JOBATTR="@LUNA=Administrator"
    @PJL SET COPIES=1
    @PJL SET PAGES=5-9     ← Designation of pages @PJL SET JOBATTR="@FOLD=BIFOLDOUTSIDE" ← Fold @PJL SET RENDERMODE=COLOR     ← Color Data of 5th page
    Data of 6th page
    Data of 7th page
    Data of 8th page
    Data of 9th page <Driver Selection Screen G132: S132>

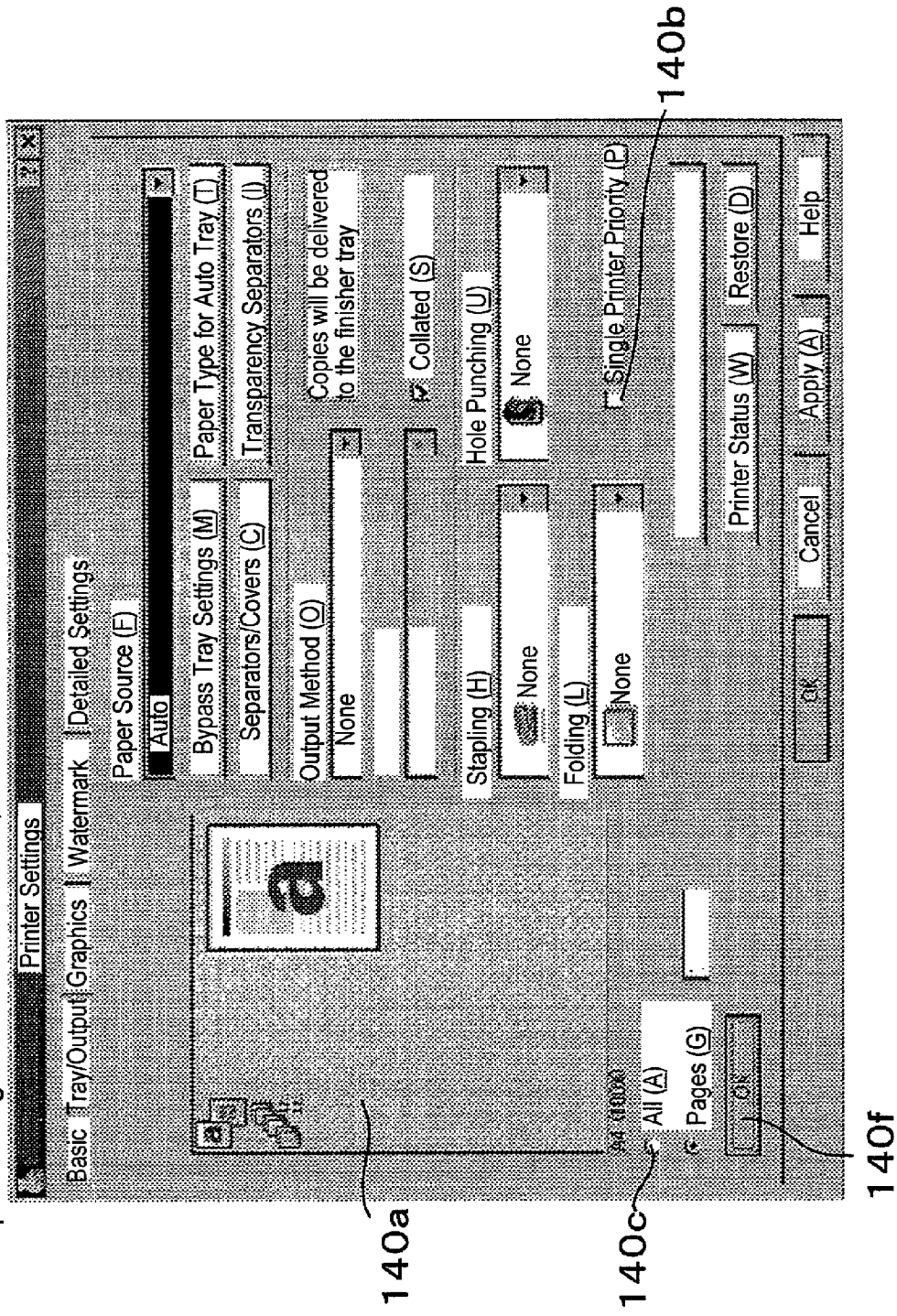
FIG. 4B  <Output Setting Screen G140: S142, S150>

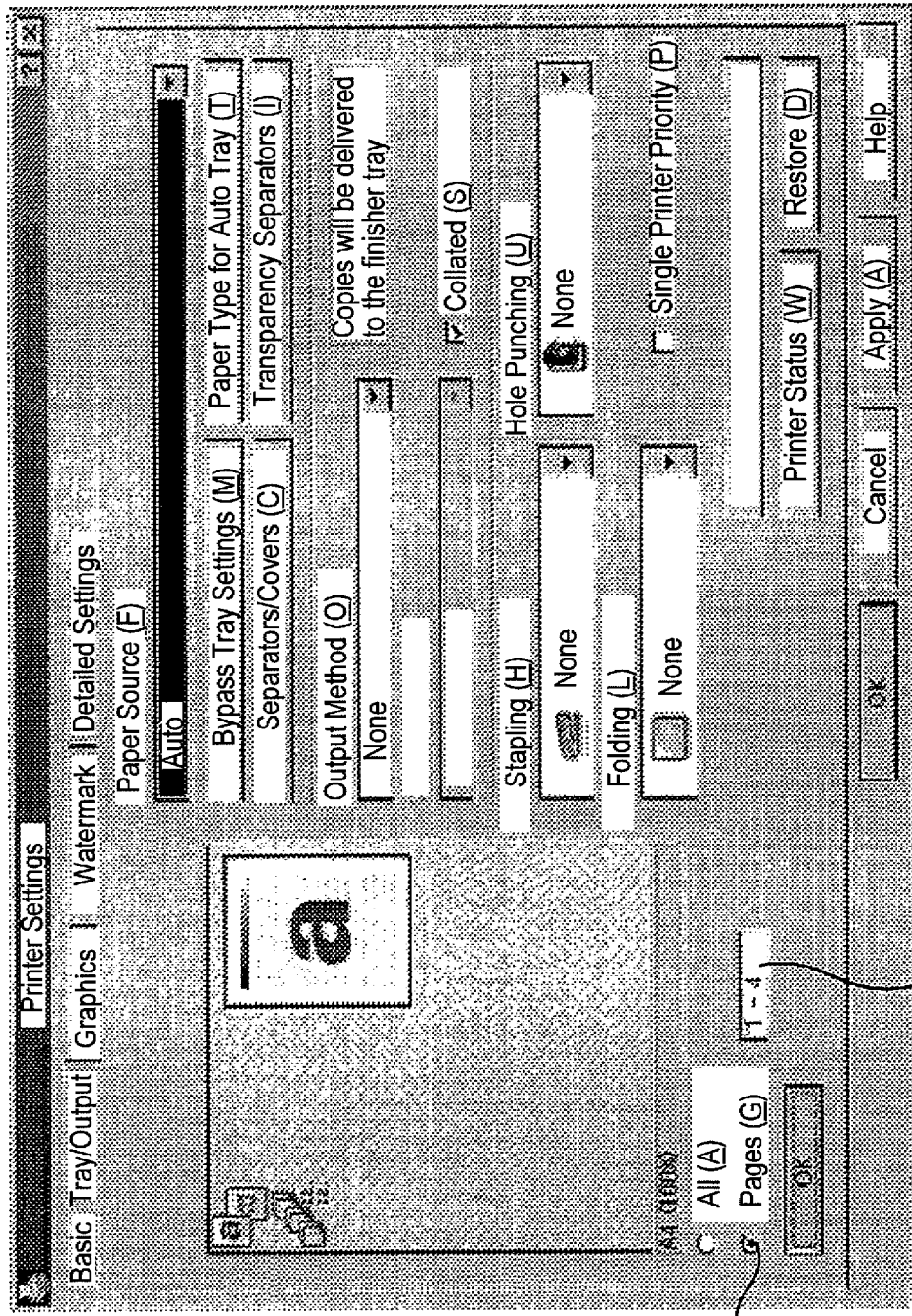
FIG. 4C <Output Setting Screen G140: S152>

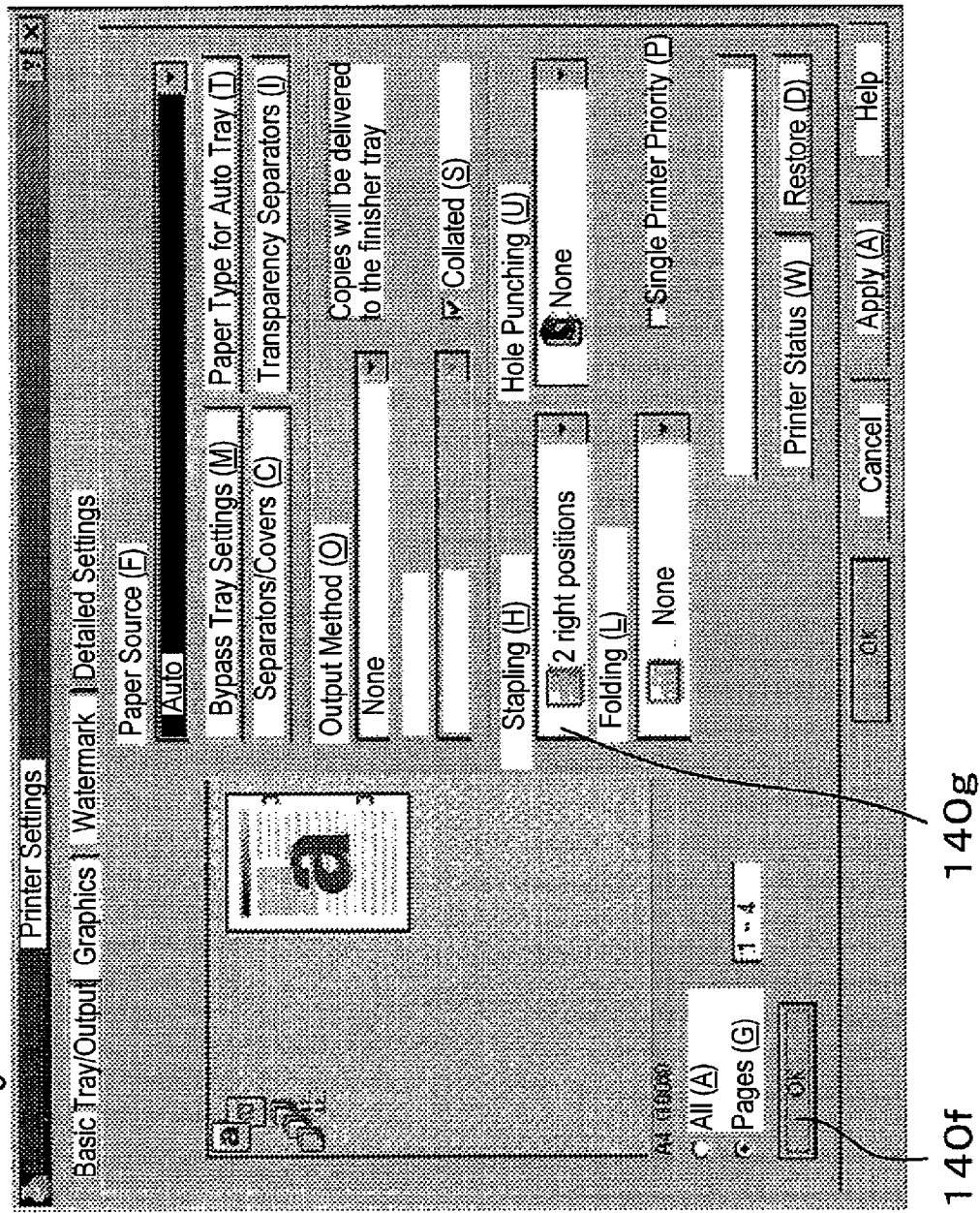
FIG. 4D  <Output Setting Screen G140: S154>

FIG. 4E <Output Setting Screen G140: S150>
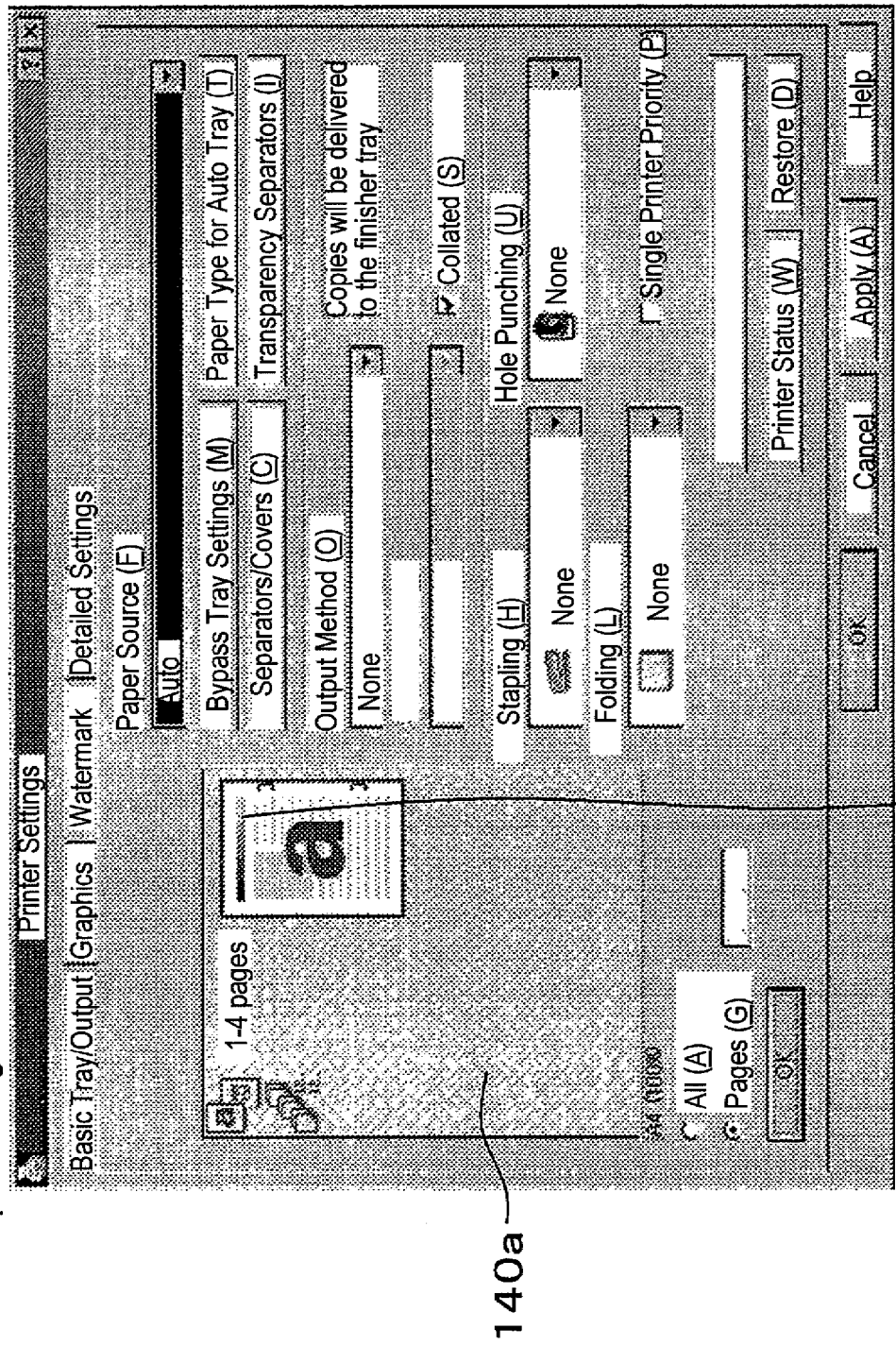

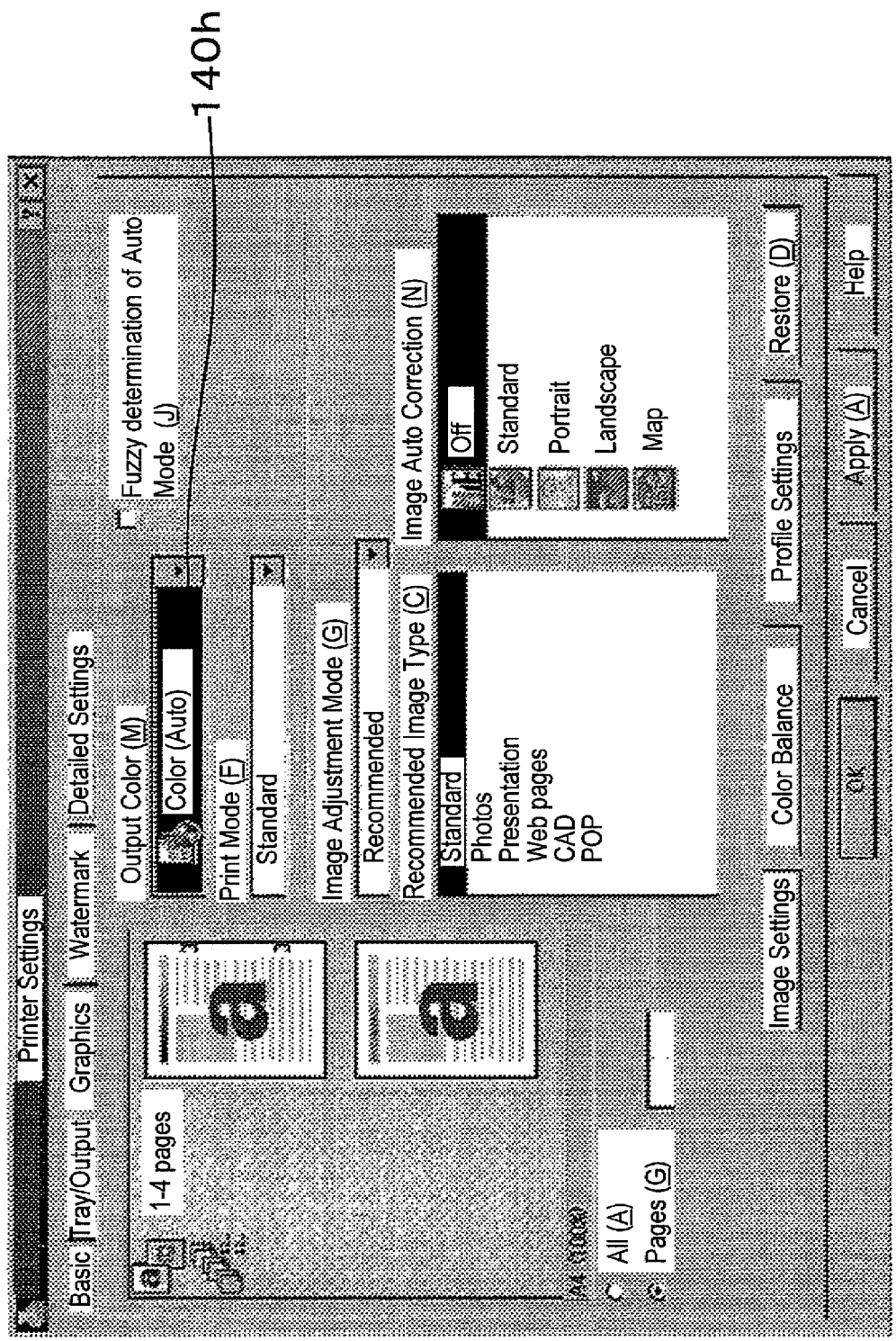
FIG. 4F  <Output Setting Screen G140: S154>

Image output setting control system (including image output setting control apparatus 2B; second exemplary embodiment)

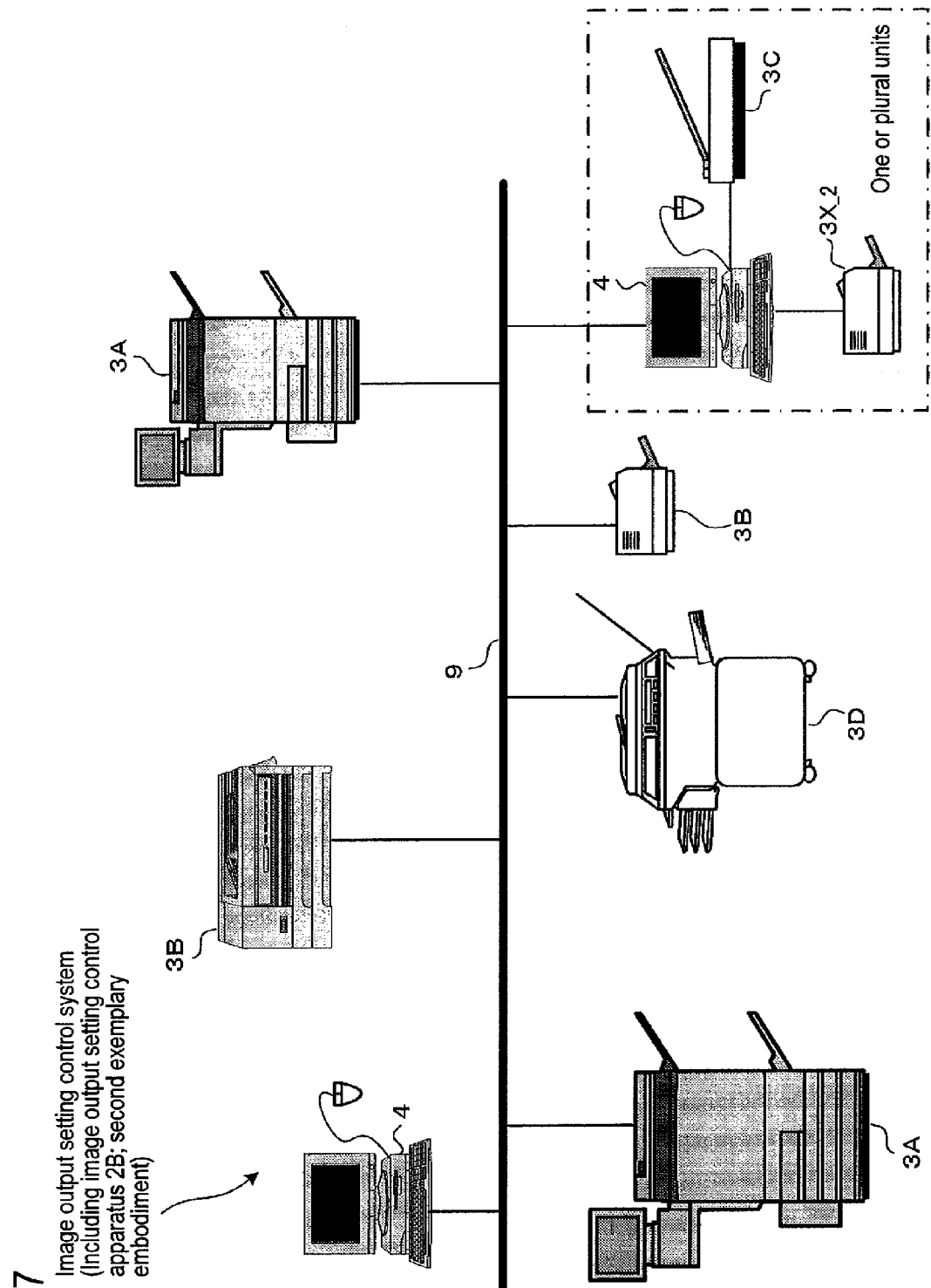

FIG. 8B

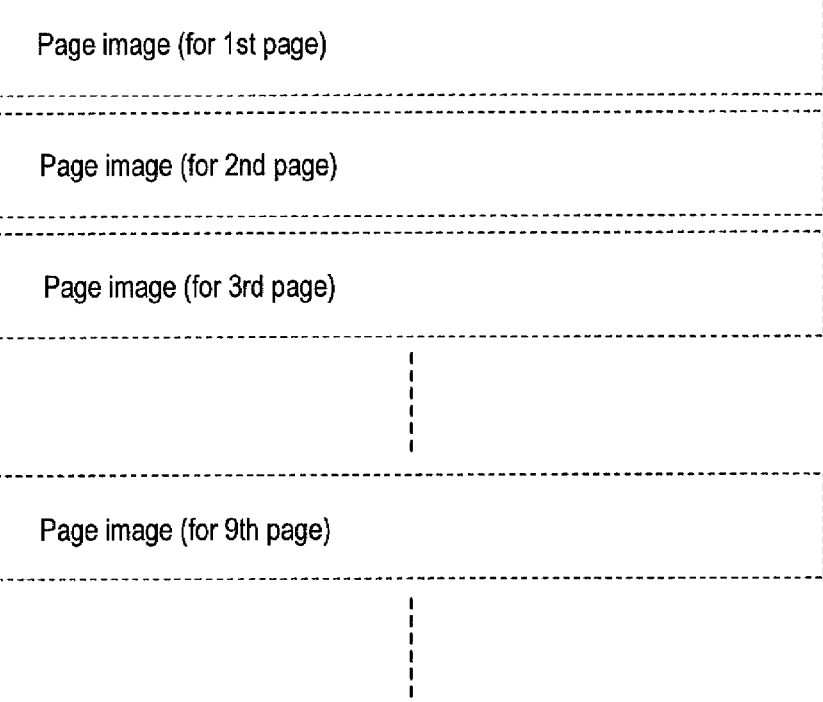

<Format Example of Output Job>
Third Exemplary Embodiment: (393b)
Image output setting control apparatus 2B → Image output apparatus 3X

```
_%-12345X@PJL JOB MODE=PRINTER
@PJL SET JOBATTR="@LUNA=Administrator"
@PJL SET COPIES=1
@PJL SET PAGES=1-4             ←————————— Page designation
@PJL SET STAPLE=RIGHTDUAL      ←————————— Staple 2 positions on right side
@PJL SET RENDERMODE=GRAYSCALE  ←————————— Black and white (grayscale)
.................................
_%-12345X@PJL JOB MODE=PRINTER
@PJL SET JOBATTR="@LUNA=Administrator"
@PJL SET COPIES=1
@PJL SET PAGES=5-9                      ←————————— Page designation
@PJL SET JOBATTR="@FOLD=BIFOLDOUTSIDE"  ← Half fold
@PJL SET RENDERMODE=COLOR               ←————————— Color
..............................
```

Page image (for 1st page)

Page image (for 2nd page)

Page image (for 3rd page)

Page image (for 9th page)

IMAGE OUTPUT SETTING CONTROL SYSTEM, IMAGE OUTPUT SETTING CONTROL APPARATUS, IMAGE OUTPUT INSTRUCTION APPARATUS, MANAGEMENT SERVER, IMAGE OUTPUT APPARATUS, COMPUTER-READABLE MEDIUM AND COMPUTER DATA SIGNAL FOR DESIGNATING DIFFERENT OUTPUT CONDITIONS

CROSS-REFERENCE TO RELATED APPLICATIONS

This application is based on and claims priority under 35 USC 119 from Japanese Patent Application No. 2008-120110 filed on May 2, 2008.

BACKGROUND

The invention relates to an image output setting control system, an image output setting control apparatus, an image output instruction apparatus, a management server, an image output apparatus, an image output instruction method, a management method, a computer-readable medium and a computer data signal.

SUMMARY

According to an aspect of the invention, an image output instruction apparatus includes an output condition reception section and an output instruction section. The output condition reception section receives, for each predetermined range of a document to be output, a setting of an output condition concerning an image output process. The output instruction section provides a first output instruction to a first image forming apparatus based on the output conditions for the respective predetermined ranges received by the output condition reception section.

BRIEF DESCRIPTION OF THE DRAWINGS

Exemplary embodiments of the invention will be described in detail based on the following figures, wherein:

FIG. 3A is a diagram showing a format example of a print property command group which is generated by a print property command generation section and which is transmitted to the management server side by a print property command transmission section in a basic example of the first exemplary embodiment;

FIG. 3B is a diagram showing a format example of an output job which is generated by a print job generation section and which is transmitted to the management server side by an output job transmission section in the basic example of the first exemplary embodiment;

FIG. 3C is a diagram showing a format example of segment jobs for respective settings, which are transmitted to the image output apparatuses by a job analysis allocation section in the basic example of the first exemplary embodiment;

FIG. 4B is a diagram showing an example of an output setting screen G140 (in S142 and S150);

FIG. 4C is a diagram showing an example of the output setting screen G140 (in S152);

FIG. 4D is a diagram showing an example of the output setting screen G140 (in S154);

FIG. 4E is a diagram showing an example of the output setting screen G140 (in S150);

FIG. 4F is a diagram showing an example of the output setting screen G140 (in S154);

FIG. 7 is a diagram showing a configuration example of the image output setting control system suitable for a third exemplary embodiment;

FIG. 8B is a diagram showing a format example of an output job to be transmitted to the image output apparatus by the output instruction section (in S393b) in the third exemplary embodiment;

DETAILED DESCRIPTION

Hereinafter, exemplary embodiments of the invention will be described in detail with reference to the accompanying drawings.

<System Configuration>

Figure 1:
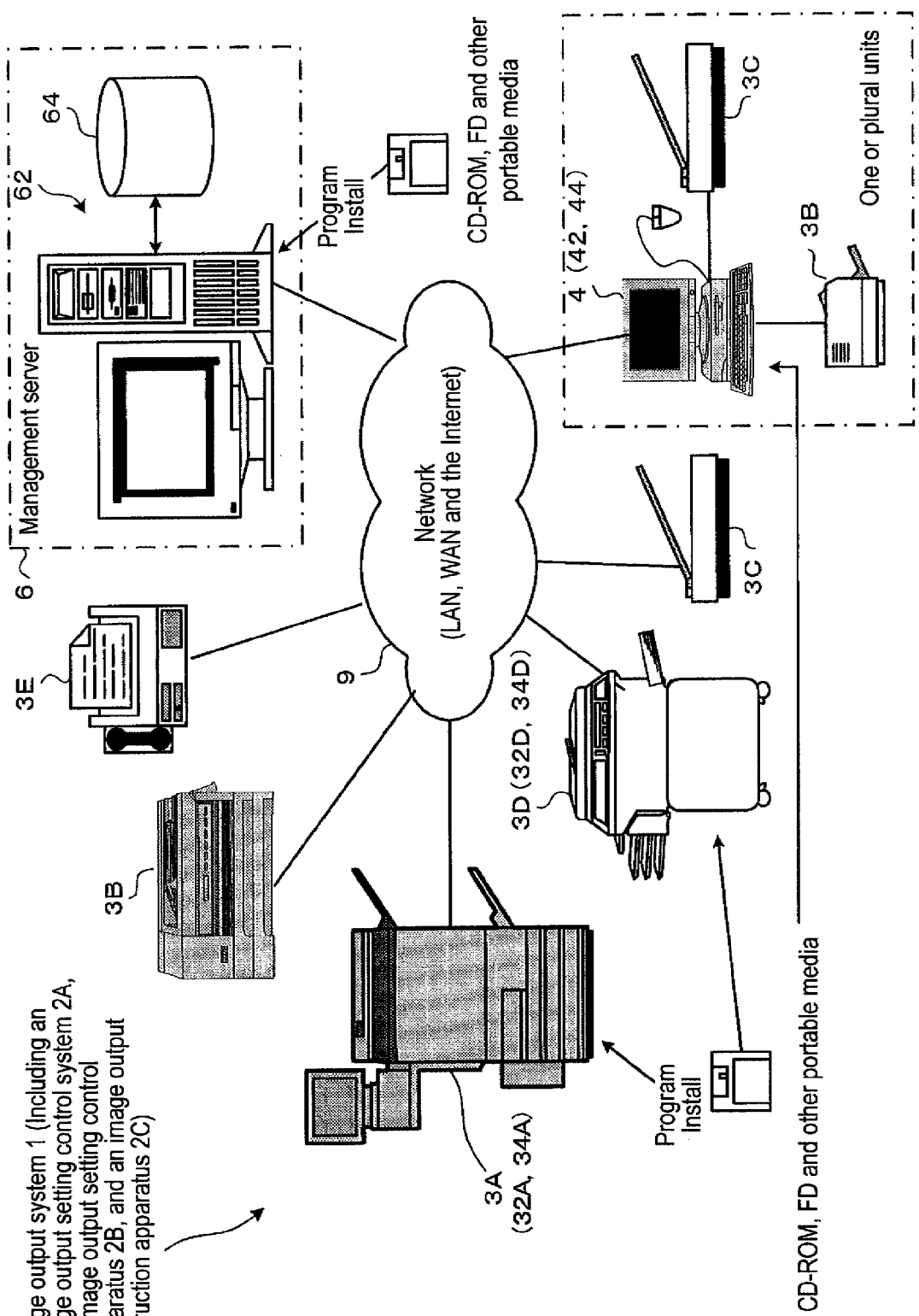
FIG. 1 is a diagram showing a configuration example of an image output system according to an exemplary embodiment of the invention.

FIG. 1 is a diagram showing a configuration example of an image output system 1 according to an exemplary embodiment of the invention. As shown in this figure diagram, the image output system 1 of this exemplary embodiment is configured to include various imaging apparatuses 3, an information processing terminal 4 and a management server 6, which are connected by a network which is an example of a communication device. Each of the imaging apparatuses 3 has an image acquisition function for reading an image from an output medium to acquire electronic data (image data) thereof and/or an image output function for outputting an image onto an output medium such as a paper. The information processing terminal 4 such as a personal computer (hereinafter, also refereed to as "PC") provides an instruction for an image acquisition process and/or an instruction for an image output process to the various imaging apparatuses 3. The management server 6 stores and manages processed document images and has a server function for issuing an image output instruction in cooperation with the information processing terminal 4, for example.

The network 9 is provided by a LAN (Local Area Network), a WAN (Wide Area Network), and/or the Internet, for example.

For example, the imaging apparatuses 3 include: a copier 3A having an image acquisition function and an image output function (a combination of these functions will be called a "copying function"); a printing device 3B that has a single function (e.g., only a printing function which is an example of the image output function) and is called a "printer"; an image reading device 3C that has an image acquisition function (which is, in particular, called a "scanner function") and is called a "scanner"; a multifunction device 3D (MFP: Multifunction Printer) having a printing function, a copying function and/or a scanner function; and a facsimile 3E. These imaging apparatuses are connected to the management server 6 via the network 9 or a predetermined connection interface. FIG. 1 shows the imaging apparatuses 3 on the assumption that one or two of each type of the imaging apparatuses 3 is/are provided, but the number of each type of the imaging apparatuses 3 may be any number. Furthermore, any or some of the imaging apparatuses 3 may be omitted depending on the system operation. Each operation example thereof will be described later.

Among the imaging apparatuses 3, ones having an image output function such as the printing device 3B or the multifunction device 3D will be particularly referred to as an "image output apparatus 3X". In this exemplary embodiment, the image output apparatus 3X is a so-called page printer that collectively outputs (prints) data for one page.

For example, the copier 3A is connected to the management server 6 via the network 9, and when a user has provided a copying instruction by operating an operation panel (not shown) of the copier 3A, the copier 3A transmits a read image (which is specifically image data serving as electronic data thereof, and the same goes for the following description) to the management server 6 in accordance with the copying instruction. At this time, the copier 3A may authenticate the user who has provided the copying instruction by making the user input a user name and/or a password, and may transmit information including the user name, which has been obtained by the authentication and by which the user is identified, to the management server 6 together with the image.

Moreover, instead of performing a process of forming the read image on a sheet as it is, the copier 3A receives, from the management server 6, an image to be subjected to an image forming process, and forms the corresponding image on a sheet based on the received image. In other words, the copier 3A temporarily transmits the image, which has been obtained by reading a manuscript to be copied, to the management server 6, and continues the process based on the image received from the management server 6.

The printing device 3B is connected to the information processing terminal 4 via a serial bus interface or the like, or connected to the management server 6 via the network 9 or the like, and forms an image on an output medium such as a sheet based on a printing image input from the information processing terminal 4 and/or the management server 6.

The image reading device 3C is connected to the information processing terminal 4 via a serial bus interface or the like, or connected to the management server 6 via the network 9, and when a user has provided a reading instruction by operating an operation panel (not shown) of the image reading device 3C or the information processing terminal 4, the image reading device 3C reads a manuscript in accordance with this reading instruction and sends an electronic manuscript (image data), converted into electronic form, to the information processing terminal 4 and/or the management server 6. In sending the electronic manuscript to the management server 6, the image reading device 3C may authenticate the user who has provided the reading instruction by making the user input a user name and/or a password, and may transmit information including the user name, which has been obtained by this authentication and by which the user is identified, to the management server 6 together with the electronic manuscript (image data).

The multifunction device 3D is connected to the management server 6 via the network 9, and executes the respective functions of the copier 3A, the printing device 3B and the image reading device 3C.

The facsimile 3E is connected to the management server 6 via the network 9 of the like, faxes a read image, or outputs a fax image onto an output medium such as a sheet based on a received image, and outputs a processed image at the time of transmission/reception to the management server 6.

The information processing terminal 4 includes general information processing functions such as document creation and data processing, and further includes an image output instruction function. In other words, the information processing terminal 4 also functions as an image output instruction apparatus. The information processing terminal 4 is connected not only to the printing device 3B but also to the management server 6 via the network 9. When the information processing terminal 4 functions as the image output instruction apparatus, the information processing terminal 4 transmits an image to be processed by the printing device 3B and/or the multifunction device 3D (which is specifically included in a print job (output job) for an image output process), and supplementary information, such as the name of a user who provides a process instruction, to the management server 6. The information processing terminal 4 has a control section 42A for controlling these functions, and a data retention section 44 such as a hard disk device for storing an electronic document to be subjected to an image output process. The data retention section 44 may be internally provided, or may be a storage device connected to the outside via a USB (Universal Serial Bus) or the like.

The copier 3A and the multifunction device 3D have: control sections 32A and 32D associated therewith, respectively; and data retention sections 34A and 34D associated therewith, respectively. The data retention sections 34A and 34D each include, as a storage device, a hard disk device and/or an optical disk device for storing an electronic document which is converted into electronic form by reading a manuscript by its image reading function (and which is to be finally subjected to an image output process).

The management server 6 includes a server function, performs control for an image acquisition process and/or an image output process in the imaging apparatus 3 in response to a request from the information processing terminal 4 serving as a client system, and records and saves a processed image in a predetermined storage device. Therefore, the management server 6 has: a control section 62; and a data retention section 64 including, as a storage device, a hard disk device and/or an optical disk device for storing an electronic document to be subjected to an image output process.

The data retention sections 34A, 34D, 44 and 64 each function as a manuscript/document storage section for storing an electronic document to be subjected to an image output process.

The image output system 1 of this exemplary embodiment includes an image output setting control system 2A, an image output setting control apparatus 2B and an image output instruction apparatus 2C, which are capable of controlling an output setting (contents of which will be described later) for each electronic manuscript at the time when an image output process is performed using (i) an electronic document which is obtained by reading a manuscript by the image reading function of the copier 3A, the image reading device 3C and/or the multifunction device 3D and converting it into an electronic form, and/or (ii) an electronic document which has already been saved (which includes an electronic document which was obtained by reading a manuscript and which was saved in the past; specifically an electronic manuscript of each of pages constituting the electronic document). Although detailed description will be made later, when an output instruction is issued for the entire or a part of (e.g., a predetermined number of pages of) electronic document constituted of plural pages (e.g., plural electronic manuscripts), the image output setting control system 2A, the image output setting control apparatus 2B and the image output instruction apparatus 2C are configured so as to be capable of making an individual output setting (hereinafter also referred to as an "individual setting") for each output page range such as a predetermined number and/or a predetermined position.

For example, the information processing terminal 4 such as a PC may have the functions of the image output setting control apparatus 2B. In this case, the information processing terminal 4 not only issues an output instruction, in which the same output condition is set to all pages, to a device(s) (the copier 3A, the printing device 3B and/or the multifunction device 3D) having an image output function and being connected to a cable (e.g., a USB interface) and/or the network 9, based on (i) an electronic document acquired by the various imaging apparatus(es) 3 (the copier 3A, the image reading device 3C and/or the multifunction device 3D) each having an image reading function and/or (ii) an electronic document generated by the information processing terminal 4 itself Also, the information processing terminal 4 may perform output control in accordance with an output condition different for each page. A storage device such as a hard disk device contained in this information processing terminal 4 may be utilized as a document storage section for storing an electronic document. Alternatively, a data retention section 34D provided in the multifunction device 3D may be utilized as the document storage section for storing an electronic document.

Alternatively, the system may be configured such that the copier 3A and the multifunction device 3D, each having a network communication function, are equipped with the image output setting control apparatus 2B. Alternatively, the system may be configured such that the management server 6 is equipped with the image output setting control apparatus 2B. The functions of the imaging apparatuses 3 and the management server 6 in this case are not limited to the issuing of an output instruction in accordance with the same output condition for all pages, but the imaging apparatuses 3 and the management server 6 may also perform output control in accordance with an output condition that varies from one page to another.

Alternatively, the image output instruction apparatus 2C incorporated into the information processing terminal 4 such as a PC and the management server 6 may be operated in cooperation with each other to implement the image output setting control system 2A, which issues an output instruction to a device(s) (such as the copier 3A, the printing device 3B and/or the multifunction device 3D) being connected to the network 9 and having the image output function. In this case, the image output setting control system 2A not only carries out output control under the same output condition for all pages, but also may carry out output control under an output condition different for each predetermined page range.

Thus, where and how the respective sections are provided in the system may be arbitrarily determined, and the respective sections necessary for performing processes may be configured so as to be organically connected to complete the overall processes. The hardware, software, network, a combination of hardware, software and network, and/or any other means may be used as a specific configuration of the respective sections (including the functional blocks) for realizing this exemplary embodiment. This would be self-evident to those skilled in the art. Further, functional blocks may be combined and unified into a single functional block.

<Functional Blocks: Basic Configuration>

Figure 1A:
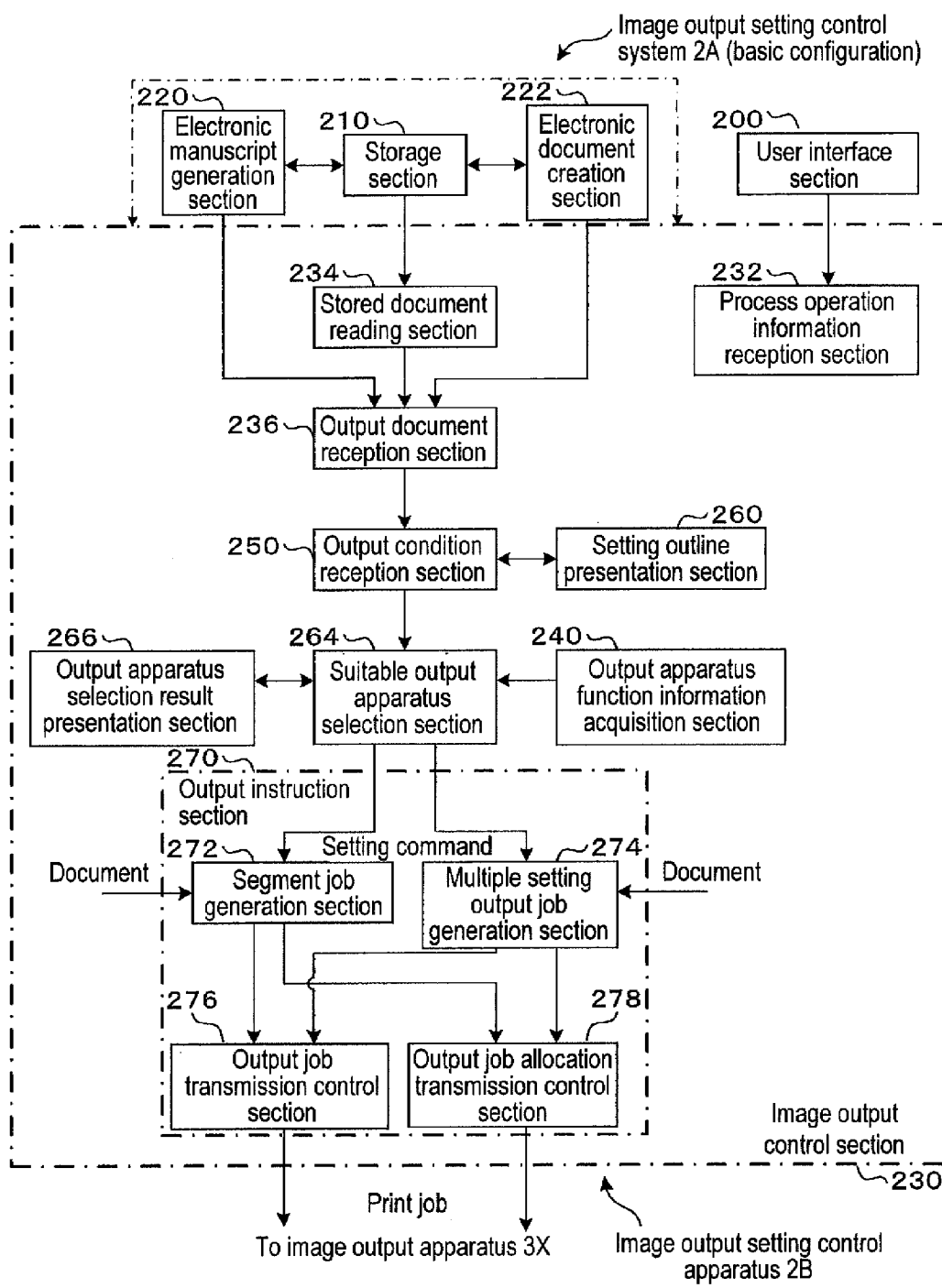
FIG. 1A is a functional block diagram of the basic configuration which focuses on an image output setting control system and an image output setting control apparatus in the image output system shown in FIG. 1.

FIG. 1A is a functional block diagram of the basic configuration focusing on the sections (e.g., the image output setting control system 2A and the image output setting control apparatus 2B) concerning the functions of realizing a mechanism for enabling an output setting for each page in the image output system 1. Although the configuration shown in this diagram is referred to as "basic configuration", it does not mean the simplest configuration, but it means a typical configuration example.

The image output setting control system 2A having the basic configuration includes: a user interface section 200 that presents an operation screen and receives an operation instruction from a user; a storage section 210 that stores electronic documents; an electronic manuscript generation section 220 that generates electronic manuscripts which is image data obtained by reading manuscripts; and an electronic document creation section 222 that creates an electronic manuscript and an electronic document using an application AP such as word processing software or graphic software.

The user interface section 200 displays various pieces of information to a user who utilizes the image output setting control system 2A and/or the image output setting control apparatus 2B. The user inputs various pieces of information to the user interface section 200. For example, the user interface section 200 includes a display section having a display with a touch panel, and/or an input section having various buttons, switches and keys. For example, an instruction member such as a keyboard or a mouse of the information processing terminal 4 and the management server 6 shown in FIG. 1 corresponds to the input section of the user interface section 200. A display device such as the operation panel of each imaging apparatus 3 shown in FIG. 1 corresponds to the display section of the user interface section 200.

The electronic manuscript generation section 220 optically reads an image of a manuscript. An image reading functional part such as the copier 3A, the image reading device 3C, and the multifunction device 3D shown in FIG. 1 corresponds to the electronic manuscript generation section 220. Typically, a module incorporated, as a program, into the information processing terminal 4 such as a PC corresponds to the electronic document creation section 222. For example, the electronic manuscript generation section 220 is configured using: a light source unit for irradiating a manuscript surface with image-reading linear light; a plurality of mirrors each of which reflects light reflected from the manuscript surface in a predetermined direction; an imaging lens for forming light reflected by these mirrors into an image at a predetermined position; and a photoelectric converter (e.g., a line sensor that uses a CCD, CMOS or the like) for receiving the light through which an image has been formed by this imaging lens, and for performing photoelectric conversion thereon. It is preferable for the electronic manuscript generation section 220 to include an auto document feeder ADF for feeding manuscripts toward a manuscript reading position one by one sequentially. The electronic manuscript generation section 220 generates a single page of an electronic manuscript from image data obtained by reading a single manuscript.

The storage section 210 saves (the term "store" or "accumulate" may also be used) an electronic manuscript itself and/or plural electronic manuscripts put into a single electronic document in a mass storage medium such as a hard disk device or an optical disk device, for example. The data retention sections 34A, 34D, 44 and 64 shown in FIG. 1 correspond to the storage section 210. Electronic documents stored in the storage section 210 include: an electronic document including an electronic manuscript obtained by reading a manuscript with the electronic manuscript generation section 220; an electronic document including an electronic manuscript created by the electronic document creation section 222 using the application AP; and an electronic document acquired via the network 9.

Moreover, the image output setting control system 2A includes: an output apparatus function information acquisition section 240 that acquires function information concerning an output setting for each image output apparatus 3X (specifically, information about a functional item that can be set by a user); an output condition reception section 250 that receives, for a desired page of an electronic document stored in the storage section 210, (i) designation of the image output apparatus 3X to be used for an output process and/or (ii) an output setting from a user; and a setting outline presentation section 260 that presents to a user, as an image and/or a character, an outline of an output condition (e.g., contents of the output condition) received by the output condition reception section 250.

Further, if use of the plural image output apparatuses 3X is permitted, an image output control section 230 may have: a suitable output apparatus selection section 264 that selects the image output apparatus 3X suitable for the output setting designated for each output range based on the function information managed by the output apparatus function information acquisition section 240 (e.g., information that has already been registered in a database), and/or based on whether or not the image output apparatus 3X is in operation; and an output apparatus selection result presentation section 266 that presents to a user a combination of each image output apparatus 3X and the corresponding output setting.

Furthermore, the image output setting control system 2A (e.g., the image output control section 230) includes: an output instruction section 270 that generates an output job in accordance with the output setting, which is received by the output condition reception section 250 and determined, and issues the output job to an image output apparatus; and the output apparatus selection result presentation section 266 that presents to a user the combination of each image output apparatus 3X and the corresponding output setting.

The output apparatus function information acquisition section 240, the suitable output apparatus selection section 264, and the output apparatus selection result presentation section 266 are not always necessary for any system configuration, but may be considered as an arbitrary functional section so that those sections are provided in the case where use of the plural image output apparatuses 3X is permitted. For example, an image output apparatus 3X used for an output process may set in accordance with designation by a user. Alternatively, the output instruction section 270 may search for an image output apparatus 3X meeting an output setting and automatically set the found image output apparatus 3X. In the latter case, the output apparatus selection result presentation section 266 may be employed as a mechanism for presenting to a user information of the device, which will be used for the output process.

The output apparatus function information acquisition section 240, the output condition reception section 250, the output instruction section 270 and the output apparatus selection result presentation section 266 are ones of the main components of the image output setting control system 2A and the image output setting control apparatus 2B, and are incorporated into the control sections 32A, 32D, 42 and 62 shown in FIG. 1. Hereinafter, the control section, in which the output apparatus function information acquisition section 240, the output condition reception section 250, the output instruction section 270 and the output apparatus selection result presentation section 266 are incorporated, will be referred to as the "image output control section 230".

The hardware configuration of the image output control section 230 may have a mechanism similar to that of a general electronic computer including, for example, a CPU (Central Processing Unit) that plays a pivotal role in performing a control process and/or arithmetic processing, and a memory device such as a RAM (Random Access Memory) or a ROM (Read Only Memory) for storing process data and/or program data. A hardware configuration example thereof is well known as a configuration of an electronic computer including a personal computer, which is formed to include a microprocessor or the like for executing software for a predetermined process (one such example will be described later).

If the hardware configuration of the image output control section 230 is formed in the manner similar to that of an electronic computer, the image output control section 230 can employ the mechanism of a so-called printer driver for generating an output job and transmitting the output job to any of the image output apparatuses 3X and/or the management server 6. In other words, the electronic computer stores the application AP such as word processing software or graphic software, and a printer driver serving as a program for controlling the image output apparatus 3X and/or the management server 6. The printer driver generates an output job (which will also be referred to as a "print job") based on a designated output setting (which will also be referred to as an "output condition", a "print condition" or a "print property"). The output job includes an output setting and image data (print data) which is contents to be formed as an image onto a paper medium.

For communication of image data between the image output control section 230 and the image output apparatus 3X or the management server 6, a program language, which is called a "page description language (PDL)", is used since the image output apparatus 3X is a page printer. The output job generated by the image output control section 230 is transmitted to the image output apparatus 3X. In general, based on PDL data received from the image output control section 230 (or from the management server 6), the image output apparatus 3X performs conversion on a page-by-page basis to obtain bitmap image data (image), accumulates the bitmap image data in a predetermined storage device, and then performs printing.

For a single document constituted by plural pages, the output condition reception section 250 of the image output control section 230 of this exemplary embodiment receives an output setting for each predetermined page range. In a single output process of the single document, the output instruction section 270 issues a single output instruction including plural output settings, which are received by the output condition reception section 250 and are set for plural print page ranges, respectively. In this exemplary embodiment, when a single output instruction including plural output settings is issued, an output job may have various formats depending on (i) whether one image output apparatus or plural image output apparatuses are used and/or (ii) whether or not an output process is performed via the management server 6.

If the output control is performed via the management server 6, the image output setting control apparatus 2B is divided into the image output instruction apparatus 2C and the management server 6, and the image output control section 230 is divided into a first image output control section provided for the image output instruction apparatus 2C and a second image output control section provided for the management server 6. Further, as the image output control section 230 is divided into the two parts, new components are added in order to exchange information between the two parts unlike the singular configuration. In regard to this point, a specific example will be shown and described later.

For example, if, similarly to a related art, the image output apparatus 3X is in a mode (which will also be referred to as a "a single job/single setting-permission" mode) in which only one type of an output setting is received in response to a single output execution instruction for a single document, which is constituted by plural pages and is subject to an image output (which will also be referred to as a "print target document"), there is employed a mechanism for generating segment jobs for respective settings on a output setting basis and issuing an output instruction for each segment job. In this case, the image output control section 230 (specifically, the output instruction section 270) transmits the plural segment jobs, which are generated based on a single output execution instruction from a user. Although the output job is divided into plural segment jobs, in performing a single output process for a single document, the image output control section 230 transmits plural segment jobs for respective settings based on the single output execution instruction including plural output settings received by the output condition reception section 250. Further, in this case, if the single image output apparatus 3X is used, this single image output apparatus 3X can cope with plural types of output settings. Then, the plural segment jobs for respective settings are transmitted to the same image output apparatus 3X.

Alternatively, if use of the plural image output apparatuses 3X is permitted, a mechanism for selecting at least one of the image output apparatuses 3X that can cope with plural types of output settings may be employed. This selection may be made by a user. However, the image output control section 230 may employ the following mechanism: That is, the output apparatus function information acquisition section 240 acquires function information concerning the output setting of each image output apparatus 3X, and the image output apparatuses 3X capable of coping with an output process for a segment job for setting is automatically selected with reference to the respective output settings. In this case, the image output control section 230 (specifically, the output instruction section 270) allocates and transmits plural segment jobs for respective settings, which are generated based on a single output execution instruction from a user, to the image output apparatuses 3X capable of coping with the output process for the segment jobs. In this case, a so-called "divided printing", in which the plural image output apparatuses 3X are used for a single output job, is performed. Therefore, a mechanism may be employed for presenting, to a user, information indicating which of the image output apparatuses 3X is used and/or reference information used when printed materials, which have been subjected to divided printing, are brought together (e.g., insertion printing of page position transfer information described in JP 2001-344083 A).

On the other hand, if, unlike the technique of the related art, the image output apparatus 3X is in a new mode (hereinafter referred to as a "single job/multiple setting-permission" mode) in which plural types of output settings can be received in response to a single output execution instruction for a single document, which is constituted by plural pages and is subject to image output (which will also be referred to as a "print target document"), or if the output control is performed via the management server 6, the image output control section 230 (specifically, the output instruction section 270) can transmit an output instruction as a single output job in which an individual output setting is made for each print range.

When the output control is performed via the management server 6, the first image output control section of the image output setting control apparatus 2B transmits, to the management server 6, an output instruction as a single output job in which an individual output setting is made for each print range. The second image output control section of the management server 6, which has received the output job in which the individual output setting is made for each print range, performs a process similar to that performed by the first image output control section of the image output setting control apparatus 2B according to whether the image output apparatus 3X managed by the management server 6 is in the single job/single setting-permission mode like the technique of the related art or in the new single job/multiple setting-permission mode.

In order to perform the above-described control, the image output control section 230 has: a process operation information reception section 232 that receives information of a process operation such as an output instruction from an operation device such as the operation panel provided in the imaging apparatus 3; and a stored document reading section 234 that reads out an electronic document used for an output process from among various electronic documents stored in the storage section 210.

The image output control section 230 also has an output document reception section 236 that receives an electronic manuscript and/or an electronic document (which will be collectively referred to as "output information") to be subjected to an output process from the electronic manuscript generation section 220 (e.g., a document reading functional section provided in the copier 3A, the image reading device 3C and the multifunction device 3D), the electronic document creation section 222 and/or the stored document reading section 234.

The output document reception section 236 handles one or plural electronic manuscripts, generated by the electronic manuscript generation section 220, as a document to be subjected to an output process. Alternatively, from among electronic documents created by the electronic document creation section 222 and/or electronic documents that have already been registered in the storage section 210 (such as the data retention section 34A, 34D, 44 or 64) for storing electronic documents, the output document reception section 236 handles an electronic document, which has been designated by a user and read by the stored document reading section 234, as a document to be subjected to an output process.

A user sets (puts) a manuscript at a predetermined position of a manuscript reading portion of the electronic manuscript generation section 220, and performs an input for an operation such as copying, fax transmission, scanning or deletion by a shredder via the user interface section 200 (or the information processing terminal 4) such as the operation panel provided in the imaging apparatus 3. At the manuscript reading portion, from a manuscript, image data of the manuscript (which will be referred to as an "electronic manuscript" in particular) is generated, and the generated electronic manuscript is sent to the output document reception section 236 together with manuscript identification information for uniquely identifying this electronic manuscript. At this time, the manuscript may be temporarily stored in the storage section 210, if necessary.

Similarly to the technique of the related art, the output condition reception section 250 may receive only one type of an output setting (device function) for a single output job. However, in this exemplary embodiment, the output condition reception section 250 receives, as an output condition setting (which will be referred to as an "output setting") concerning an image output process, an individual setting for setting an output condition for each output page range such as a predetermined number or a predetermined position in regard to items such as a basic setting, a layout setting, a page decoration setting, and a finishing setting.

Although the term "individual setting" is used, the setting does not necessarily have to be received strictly on a page-by-page basis. Alternatively, the designation of page numbers for the same output setting may be received, and the output setting may be received for the plural pages. In short, in the mechanism of the related art, only one output setting is received for a single output job. To the contrary, in this exemplary embodiment, a single output job is divided into print page ranges in units of a predetermined number of pages, and it is allowed to receive different output settings for the respective plural print page ranges. In the simplest case, an output setting of a first type is made for a first page group of one or plural pages, and an output setting of a second type, which is different from the first type, is made for a second page group of one or plural pages. In the most complicated case, output settings of different types are made for respective plural pages.

In addition to a standard setting (default setting), which are to be set in common to all pages naturally if nothing is done, the output setting items may include a condition to be applied in common to all pages positively. In the case of employing a mechanism for receiving such a common output setting (common setting), in relation to the procedure of reception of an output setting for each page, an output setting is received for each page after a common output setting has been received. And, when an output setting is received for each page, in order to prevent that an item of the common output setting that has already been set is unintentionally corrected only in a certain page, it may be prohibited to receive setting (which is practically a change instruction) regarding the common setting that has already been set.

The basic setting includes, for example, items such as the number of pages to be printed, the number of copies, black-and-white or color, sheet size (such as A4, A3, B4 or B5), print direction (longitudinal/lateral), paper feed tray (automatic, tray number), and print quality. The setting of the print quality is selected from among "High" to "Fast" using a slide bar, or selected from among general document, photograph, DTP (Desk Top Publishing), CAD (Computer Aided Design) and the like which are registered in advance.

The layout setting includes, for example, items such as single-sided or double-sided, presence or absence of scaling (enlargement/reduction) and scaling factor setting, and presence or absence of page layout printing (n-up printing) and layout mode setting.

The page decoration setting includes, for example, items such as presence or absence of page printing and detailed setting thereof, presence or absence of a stamp mark and stamp mark setting, and presence or absence of a header and a footer and print information setting thereof.

The finishing setting includes, for example, items such as sort, finisher (terminal device), binding margin, opening direction, and bookbinding setting. The finisher includes, for example, items such as presence or absence of a punch and setting of the number of holes, and presence or absence of a staple (process of making a batch and binding it) and binding position setting.

It is not necessary for the single image output apparatus 3X to be capable of allowing all the print settings, but the respective apparatuses may have different settable items. In general, when the image output apparatuses 3X are set up, settable items associated with these image output apparatuses 3X are determined on a one-on-one basis, and a printer driver for each of the image output apparatuses 3X is prepared.

To the contrary, in this exemplary embodiment, in an attempt to cope with the case where settable items are different for the respective devices, there is provided the output apparatus function information acquisition section 240, which acquires information of settable items associated with the respective image output apparatuses 3X (e.g., function information of each image output apparatus). The output apparatus function information acquisition section 240 creates a database (DB) of the function information of the respective image output apparatuses 3X managed by the image output setting control apparatus 2B, and registers the database in a hard disk device (not shown).

The output condition reception section 250 generates an output setting screen (which is a so-called "printer driver setting screen") for enabling a user to make output settings of all functions of the respective image output apparatuses 3X acquired by the output apparatus function information acquisition section 240. A printer driver for generating the output setting screen for enabling a user to make output settings of all functions of the respective image output apparatuses 3X as described above will hereinafter be referred to as a "all-in-one driver", and is incorporated into the image output control section 230.

The output condition reception section 250 (using the all-in-one driver) has an all-output setting presentation section 252 for presenting, to a user (e.g., for displaying, on an operation panel or the like), output settings of all types of the image output apparatuses 3X, and receives user's designation for these output settings. The output condition reception section 250 notifies the output instruction section 270 of information about an output setting for each page, which has been received from a user.

The output instruction section 270 has either (i) a segment job generation section 272 that generates, for each output setting received by the output condition reception section 250, an output job on an output setting basis (which will be referred to as a "segment job" or "segment job for setting") or (ii) a multiple setting output job generation section 274 that generates a single output job including plural types of output settings received by the output condition reception section 250. The output instruction section 270 further has an output job transmission control section 276 that instructs transmission of the output job generated by the segment job generation section 272 or the multiple setting output job generation section 274.

The segment job generation section 272 divides a single output job into jobs for respective output page ranges and generates the segment jobs for respective settings, each of which includes a page image of the corresponding output page range and the output condition of the corresponding range. On the other hand, the multiple setting output job generation section 274 generates a single output job including page images of plural output page ranges and output conditions for the respective output page ranges.

Further, if it is allowed to select an apparatus used for an output process from among the plural image output apparatuses 3X, the output instruction section 270 is provided with an output job allocation transmission control section 278 that allocates each segment job to the device capable of performing the output process and instructs its transmission.

Furthermore, if it is allowed to select a device used for an output process from among the plural image output apparatuses 3X, the image output control section 230 has the output apparatus selection result presentation section 266 that presents, to a user (e.g., for displaying on an operation panel or the like), a combination of an image output apparatus 3X for each page and the corresponding output setting, and receives user designation indicating as to whether or not an output process is performed (e.g., printing is performed) with this combination.

As can be seen from the description made with reference to FIG. 1, the differences between the image output setting control system 2A and the image output setting control apparatus 2B are whether or not the image output control section 230 and the storage section 210, the electronic manuscript generation section 220 or the like are mechanistically integrated or separated, and whether or not the management server 6 is provided (e.g., whether or not the image output control section 230 is divided into two parts). For example, the image output setting control apparatus 2B may have any configuration so long as it includes the output condition reception section 250 and the output instruction section 270 of the image output control section 230.

In the case of being connected to the plural image output apparatuses 3X, as shown in the diagram, the output apparatus function information acquisition section 240, the suitable output apparatus selection section 264 and the output apparatus selection result presentation section 266 may be incorporated into the same device (e.g., the image output setting control apparatus 2B) in an integrated manner. When the respective sections constituting the image output control section 230 are separate objects, the image output setting control system 2A is configured by connecting these modules via a connection cable, the network 9 or the like. In a typical example, the management server 6 is provided, and the functions of the image output control section 230 are partially divided into two parts, that is, the image output setting control apparatus 2B and the management server 6.

<Outline of Process Procedure>

Figure 1B:
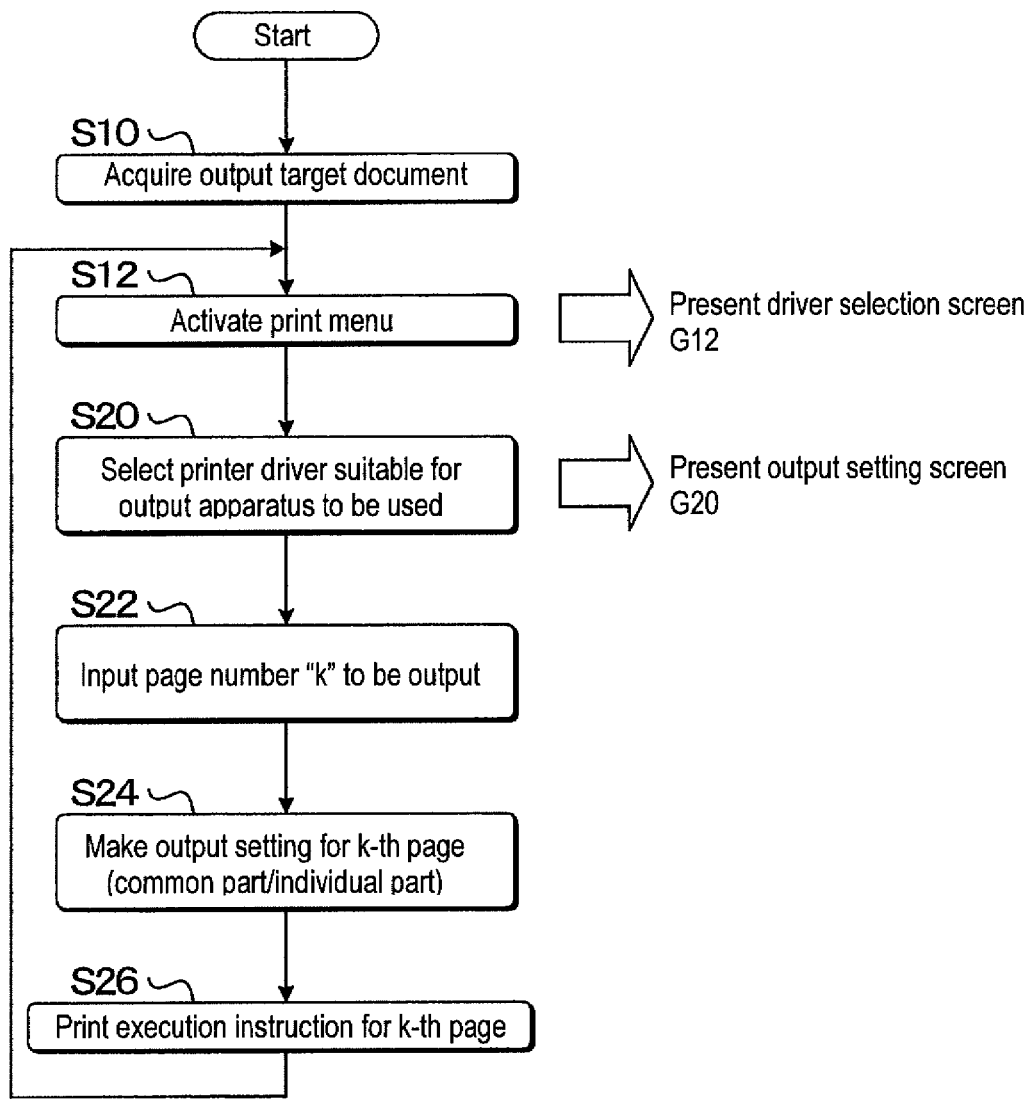
FIG. 1B is a flow chart for describing a process procedure of a comparative example for comparison with a process procedure performed in the image output setting control system and the image output setting control apparatus according to this exemplary embodiment.
Figure 1C:
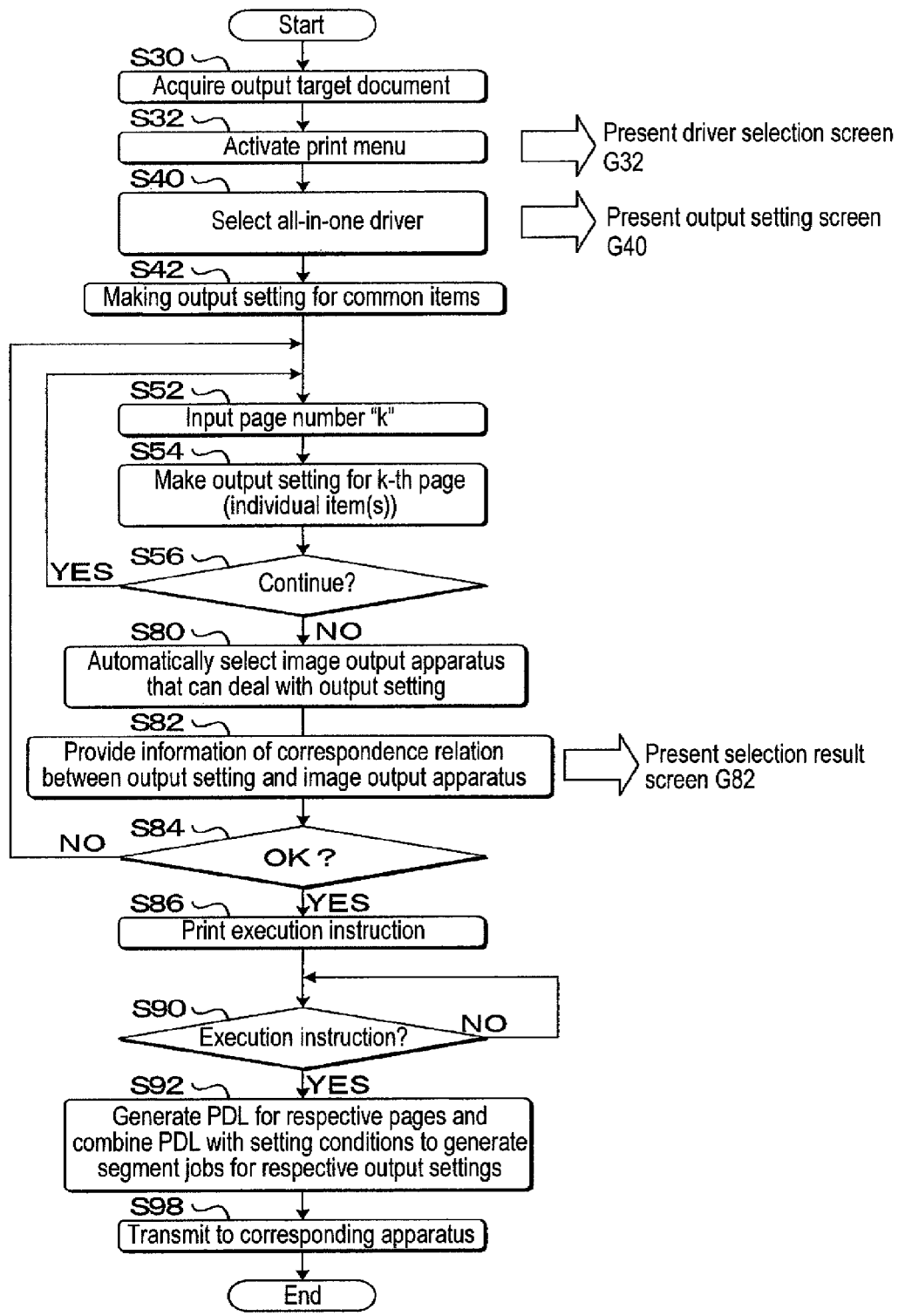
FIG. 1C is a flow chart for describing the basic process procedure performed in the image output setting control system and the image output setting control apparatus according to this exemplary embodiment.

FIG. 1B is a flow chart for describing a process procedure of a comparative example for comparison with a process procedure performed in the image output setting control system 2A and the image output setting control apparatus 2B according to this exemplary embodiment. FIG. 1C is a flow chart for describing the basic process procedure performed in the image output setting control system 2A and the image output setting control apparatus 2B according to this exemplary embodiment.

In this comparative example, the plural image output apparatuses 3X are available. The description will be made on the case where, for a single document constituted by plural electronic manuscripts, there exist some items common to all pages, while output settings of the remaining many items are different for the respective electronic manuscripts (e.g., for respective pages).

In the process procedure of the comparative example, as shown in FIG. 1B, first, an output target document is acquired (S10). Specifically, the application AP for an electronic document to be printed is activated to read out the electronic document to be printed. After an editing operation or the like has been performed, a print menu is activated with an operation menu on the application AP (S12). Then, first, a screen (which will be referred to as a "driver selection screen G12") for selecting a printer driver suitable for the image output apparatus 3X, which is desired to be used, is presented.

On this driver selection screen G12, a user selects a printer driver suitable for the image output apparatus 3X to be used (S20). Then, this printer driver presents an output setting screen G20 to the user. On this output setting screen G20, the user inputs an individual page number "k" as a print page range which is desired to be output (S22), sets an output condition to be applied to the k-th page (S24), and provides a printing execution instruction (S26). When the printing execution instruction has been successfully completed, the application AP closes the driver selection screen G12.

When there exists another print page range which is desired to be printed, the print menu is activated again with the operation menu on the application AP (S12), and the process steps similar to those described above are repeated.

That is, in order to provide an print execution instruction, which reflects an output setting different for each page, for a single print object document constituted by plural pages, the comparative example requires to perform plural print instruction operations as follows: a certain print page range is designated, a print condition applied to the certain print page range is set up, a print instruction is issued. Then, again, the output setting screen G20 is opened to set another print page range and a print condition applied to this other print page range. Furthermore, at this time, when plural image output apparatuses are available, an image output apparatus that allows a user to set an output condition, which will be designated for a print page range to be output, is selected from the print menu, and the above-described operations are performed. If the image output apparatus, which has been selected to set a given print condition for a certain print page range and to output the certain print page range, does not have a printing function being compatible with the certain print condition, a suitable image output apparatus is selected again from the print menu.

That is, when the plural image output apparatuses 3X are available, the comparative example requires to select a printer driver associated with an image output apparatus 3X that allows a user to set an output condition, which will be designated for a print page range (e.g., each page in this example) to be output. If no single image output apparatus 3X satisfies all output settings for printing, plural print instruction operations are performed as follows. A printer driver associated with an image output apparatus 3X having a desired function is selected, a print page range desired to be printed using this function is designated, a desired output setting is made, and then a printing execution instruction is provided; moreover, a printer driver suitable for another image output apparatus 3X having another function is selected, and another printing execution instruction, which designates a print page range desired to be printed using the other function, is issued.

In order to carry out such operations, the comparative example requires a user to carry out the operations after having grasped all functions of all the image output apparatuses 3X connected to the information processing terminal 4. Otherwise, if the image output apparatus 3X, which the user has selected so as to instruct output of a certain print page range, does not have the corresponding printing function, the selection of a printer driver has to be made again.

As can be seen from theses points, in the mechanism of the comparative example, it is necessary to perform complicated setting operations including the designation of a print page range for a certain document, the designation of a print condition set for this print page range, and the selection of an image output apparatus 3X (specifically, a corresponding printer driver) capable of performing a printing operation in accordance with this print condition.

On the other hand, in the procedure of this exemplary embodiment, as shown in FIG. 1C, an output target document is first acquired similarly to step S10 of the comparative example (S30). After an editing operation or the like has been performed, a print menu is activated with an operation menu on the application AP (S32). Then, first, the output condition reception section 250 (specifically, the all-output setting presentation section 252) of the image output control section 230 presents a driver selection screen G32. In this exemplary embodiment, on this driver selection screen G32, a user selects an all-in-one driver without considering which image output apparatuses 3X is to be used (S40). Then, this all-in-one driver presents an output setting screen G40 to the user.

When the all-in-one driver is used, the output apparatus function information acquisition section 240 acquires the function information (concerning output settings in particular) of the respective image output apparatuses 3X and registers the acquired function information in the database in advance, thereby grasping the functions of the respective image output apparatuses 3X. The all-in-one driver makes an inquiry to the output apparatus function information acquisition section 240 to thereby display device functions of all types of the image output apparatuses 3X as setting items presented on the output setting screen G40.

On this output setting screen G40, first, the all-output setting presentation section 252 receives user's setting of an output condition common to all pages (S42). The user sets the output condition common to all the pages, such as a page decoration setting including page printing, a header and a footer, and a finishing setting including a punch and a staple, for example. Thereafter, the process goes to a step of making individual settings for respective print page ranges (e.g., respective pages in this example) which are desired to be output.

When receiving an individual setting, the all-output setting presentation section 252 does not receive an individual setting for the common setting item received in step S42. Further, if the common setting relates to finishing, an instruction may be provided so that an output image apparatus in charge of performing an output process is the same one as the finishing apparatus.

Furthermore, the all-output setting presentation section 252 receives an individual page number "k" as a print page range which is desired to be output (S52), and receives user's setting of an output condition applied to the k-th page (S54). When there exists another other print page range which is desired to be printed (e.g., if the answer is YES in S56), the process steps similar to those described above are repeated again for the other print page range.

Upon completion of the individual setting, the user provides an instruction for this. When the process operation information reception section 232 has received this information (e.g., if the answer is NO in S56), the suitable output apparatus selection section 264 selects an image output apparatus 3X which is most suitable for the output setting (print property) designated for each print page range based on (i) an individual setting item of each print page range, (ii) the function information of the respective image output apparatuses 3X registered/managed in advance in/by the output apparatus function information acquisition section 240, and (iii) whether or not the respective image output apparatuses 3X are in operation at present (specifically, whether or not the respective image output apparatuses 3X are available). Then, the suitable output apparatus selection section 264 notifies the output apparatus selection result presentation section 266 of the selection information (S80).

The output apparatus selection result presentation section 266 presents a selection result screen G82 indicating a combination of the image output apparatus 3X selected for each print page range and the output setting for each print page range, and requests an instruction for confirming as to whether or not printing is performed with this combination (S82). On this selection result screen G82, the user confirms the combination of the image output apparatus 3X selected for each print page range and the output setting for each print page range. If there is a problem, the user provides a command indicating that there is a problem. When the process operation information reception section 232 has received this command (e.g., if the answer is NO in S84), the output condition reception section 250 returns the process to Step S52, and receives user's designation for making a setting again for the print page range having a problem. On the other hand, if there is no problem (e.g., if the answer is YES in S84), the user provides a printing execution instruction (S86).

When the process operation information reception section 232 has received the printing execution instruction (e.g., if the answer is YES in S90), the output instruction section 270 generates image data of each page in a PDL, and combines the generated image data of each page, the output setting common to all pages received in step S42 and the individual setting received in step S52, thereby generating an output job (S92). In this step, in this example, the segment job generation section 272 generates segment jobs for the respective output settings in units of output settings.

Then, the output job allocation transmission control section 278 provides an instruction for transmitting the segment job for each output setting generated by the segment job generation section 272 to the image output apparatus 3X, which is selected as being capable of coping with each output setting by the suitable output apparatus selection section 264 (S98). In other words, the output instruction section 270 generates the segment job for each output setting in which (i) a print property command group reflecting the output settings received in steps S42, S52 and (ii) PDL print data are combined for each page, and allocates and transmits the segment job for each output setting to the corresponding image output apparatus 3X.

As can be seen from the above description, for a single print target document constituted by plural pages, the mechanism of this exemplary embodiment enables a user to designate an output condition different for each page range of the target document before providing an output execution instruction. Therefore, the user's burden of providing an instruction can be reduced. A user is only required to designate a print page range for a certain document and to designate a print condition set for the designated print page range on the all-in-one driver, and to issue a single output execution instruction after the completion of all the settings. There is no need for the user to issue an output execution instruction every time the output setting is changed. The output process is completed by issuing a single output execution instruction after print designation, which is different for each page range, has been made in a single job.

In addition, after the output control section 230 automatically selects the image output apparatus 3X capable of performing an output process in accordance with each print condition, an output job is allocated to the suitable image output apparatus. Therefore, a user does not have to grasp all functions of all the image output apparatuses 3X connected to the information processing terminal 4. Thus, setting burden and setting mistakes concerning the selection of the image output apparatus 3X are reduced. This is because, in a situation where the plural image output apparatuses 3X are available, upon provision of a single output execution instruction after the print designation different for each page range is made, the image output control section 230 automatically allocates an output job (output jobs) to a suitable one (ones) of the plural image output apparatuses 3X.

In this example, the description has been made on the assumption that the image output setting control apparatus 2B selects an image output apparatus to be actually used in the state where the plural image output apparatuses 3X are available. However, in the case where only one image output apparatus 3X exists or the single image output apparatus 3X desired to be used by a user is designated even if the plural image output apparatuses 3X are available, (i) the all-in-one driver is unnecessary and (ii) the process step S80 is also unnecessary, and (ii) in step S84. In this case, an output job including a print condition individually set for each print page range is transmitted to the single image output apparatus 3X (may be one designated by the user).

<Functional Blocks: First Exemplary Embodiment: Basic Example>

Figure 2:
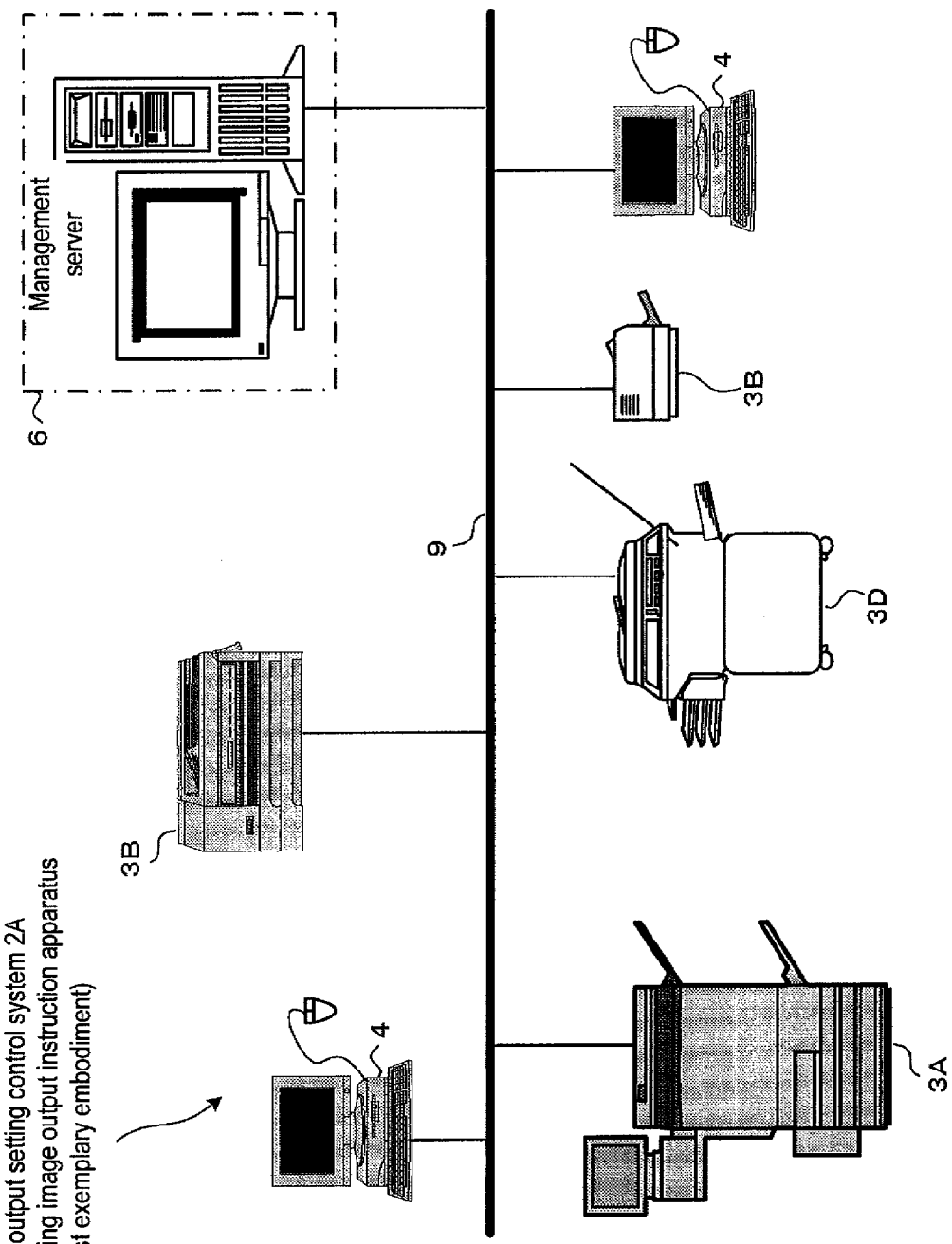
FIG. 2 is a diagram showing a configuration example of an image output setting control system suitable for a first exemplary embodiment.
Figure 2A:
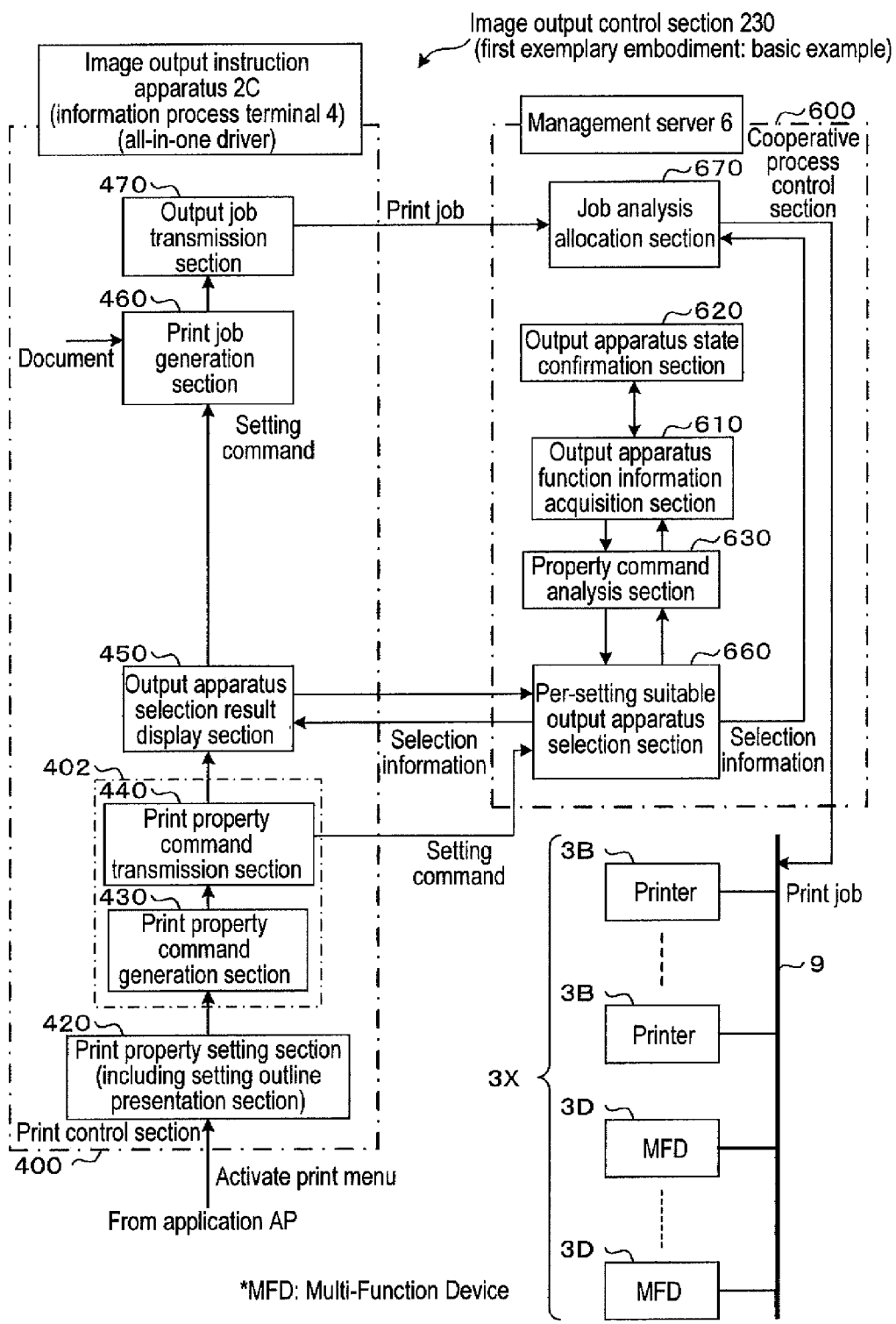
FIG. 2A is a block diagram functionally showing a specific example of an image output control section of the first exemplary embodiment.

FIGS. 2 and 2A are diagrams for describing a basic example of the first exemplary embodiment of the image output setting control system 2A and the image output setting control apparatus 2B. In particular, FIG. 2 is a diagram showing a configuration example of the image output setting control system 2A according to the first exemplary embodiment; and FIG. 2A is a block diagram functionally showing a specific example of the image output control section 230 of the first exemplary embodiment. In the following description, a correspondence relation to the functional sections of the basic configuration will be shown in parentheses.

The configuration of the first exemplary embodiment provides an example of application of a distributed output system for processing a single output job by distributing it among the plural image output apparatuses 3X via a server. As shown in FIG. 2, this configuration example is suitable for the case where an arbitrary number of the information processing terminals 4, the management servers 6 (normally, one management server 6), and the plural image output apparatuses 3X (such as the printing device 3B and the multifunction device 3D) are connected via the network 9, and the information processing terminals 4 and the management server 6 are operated in cooperation with each other to give an output instruction to the plural image output apparatuses 3X connected to the network 9. As shown in FIG. 2A, in the configuration of the first exemplary embodiment, the image output control section 230 is divided into (i) a first image output control section (hereinafter, referred to as a "printing control section 400") provided in the image output instruction apparatus 2C and (ii) a second image output control section (hereinafter, referred to as a "cooperative process control section 600") provided in the management server 6. In this example, the image output instruction apparatus 2C is included in the information processing terminal 4.

The printing control section 400 is provided in the client-side information processing terminal 4, for example, and an all-in-one driver is incorporated in the printing control section 400. This all-in-one driver is activated by the application AP for a document desired to be printed by a user, and allows a user to designate any of all functions of the all the image output apparatuses 3X managed by the management server 6.

The printing control section 400, which functions as a control section of a print instruction apparatus and can sent print conditions for all print functions including the print functions of the plural image output apparatuses 3X having different functions, designates plural print page ranges for a print target document, sets a print condition different for each designated print page range, and transmits a print instruction in which the print conditions different for the plural print page ranges are set.

In order to realize these functions, the printing control section 400 has a print property setting section 420 (equivalent to the output condition reception section 250 and including the setting outline presentation section 260) that designates, on the user interface (the output setting screen G20), a print property for each page by the all-in-one driver, a print property command generation section 430 that generates a print property command group for each page by the all-in-one driver; and a print property command transmission section 440 that transmits the print property command group for each page by the all-in-one driver. The print property command generation section 430 and the print property command transmission section 440 constitute an output condition notification section 402 that notifies the management server side of output condition information for each page range received by the print property setting section 420.

Further, the printing control section 400 has: an output apparatus selection result display section 450 (equivalent to the output apparatus selection result presentation section 266) that displays a combination of the image output apparatus 3X for each page (properly speaking, for each output setting) and a print property for each page and requests user's permission to perform printing with this combination, a print job generation section 460 that generates a job by the all-in-one driver; and an output job transmission section 470 that transmits the job, generated by the all-in-one driver, to the management server 6.

The print property command transmission section 440 sends data of only the print property to the management server 6, thereby functioning to display information (see FIG. 4I) indicating to which of the output apparatuses (e.g., the image output apparatuses 3X) a job is output. The output job transmission section 470 finally functions to send ID (identification information) and print data to the management server 6.

The cooperative process control section 600 manages the respective image output apparatuses 3X having different functions, grasps the states of the these image output apparatuses 3X, and allocates a job for each page to a corresponding image output apparatus 3X (capable of performing an output process in accordance with a set print condition) together with the print property command group in cooperation with the printing control section 400 of the information processing terminal 4.

In other words, the cooperative process control section 600 included in the management server 6 receives a print instruction transmitted from the information processing terminal 4 serving as the print instruction device, extracts an image output apparatus 3X capable of executing printing in accordance with a print condition individually set for each print page range included in the received print instruction, and transmits, for each print page range, the print instruction based on the print condition for each print page range to the extracted image output apparatus 3X.

In order to realize these functions, and in order to also cope with the case where a settable item is different for each image output apparatus, the cooperative process control section 600 has an output apparatus function information acquisition section 610 (corresponding to the output apparatus function information acquisition section 240) that acquires information of an item(s) which can be set to each image output apparatus 3X (e.g., function information for each image output apparatus), an output apparatus state confirmation section 620 that checks as to whether the image output apparatus 3X to be selected is in operation or in non-operation; and a property command analysis section 630 that analyzes the print property command group transmitted from the information processing terminal 4 in terms of the property for each page. The output apparatus function information acquisition section 610 creates a database of the function information of the respective image output apparatuses 3X managed by the management server 6, and registers the database in the hard disk device (not shown).

Furthermore, the cooperative process control section 600 has a suitable output apparatus selection section 640 (corresponding to the suitable output apparatus selection section 264) that selects an image output apparatus 3X, which is most suitable for the print property designated for each page, based on (i) the function information (stored in the database) managed by the output apparatus function information acquisition section 610 and (ii) the operation check result obtained by the output apparatus state confirmation section 620. Moreover, the cooperative process control section 600 has a per-setting suitable output apparatus selection section 660 that receives the print property command group transmitted from the information processing terminal 4 and outputs this print property command group when a user has permitted the printing based on the result of analyzing each page, and a job analysis allocation section 670 (corresponding to the output job allocation transmission control section 278) that transmits, to the suitable image output apparatus 3X, a combination of the print property command group, which has already been received, and a print job for each page. Each image output apparatus 3X executes printing based on the print instruction received from the cooperative process control section 600 (e.g., the job analysis allocation section 670).

As a result of pressing of "OK" or "cancel" on the screen by a user, information used to determine as to whether or not the ID and the print property command group on the management server 6 are maintained is sent from the output apparatus selection result display section 450 to the per-setting suitable output apparatus selection section 660. The per-setting suitable output apparatus selection section 660 collectively passes, as job data, the ID obtained from the output apparatus selection result display section 450 and data obtained by converting application data into PDL format to the job analysis allocation section 670.

In FIG. 2A, only the print property command is sent from the print property command transmission section 440 to the per-setting suitable output apparatus selection section 660. The suitable apparatus group (MFP group) is selected by the per-setting suitable output apparatus selection section 660. The per-setting suitable output apparatus selection section 660 issues an ID for the print property command group when the output apparatus selection result display section 450 is notified of this selection result. The ID and the print property command group are managed on a one-on-one basis by the management server 6. The output apparatus selection result (MFP selection result) is displayed on the output apparatus selection result display section 450.

At this time, the ID is also sent to the output apparatus selection result display section 450. Upon pressing of "OK" or "cancel" on the user interface by a user, the result is sent from the output apparatus selection result display section 450 to the per-setting suitable output apparatus selection section 660. If "OK" is pressed, the ID is maintained. If "Cancel" is pressed, information of the ID and the print property command group is deleted. The print job generation section 460 generates print data, and the output job transmission section 470 transmits the ID and the print data to the job analysis allocation section 670. Then, the ID maintained by the per-setting suitable output apparatus selection section 660 is called, and data to be sent to each output apparatus (image output apparatus 3X: MFP) is generated.

<Operation Procedure: Basic Example of First Exemplary Embodiment>

Figure 3:
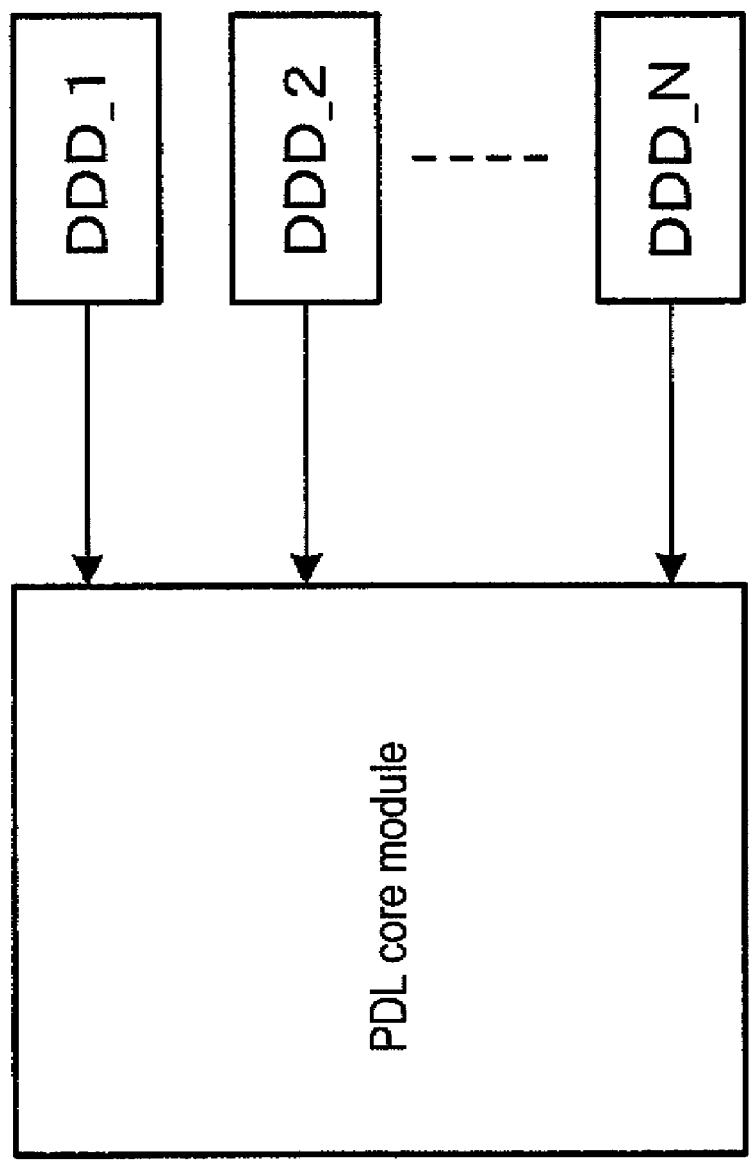
FIG. 3 is a diagram for describing a functional outline of an all-in-one driver.
Figure 4:
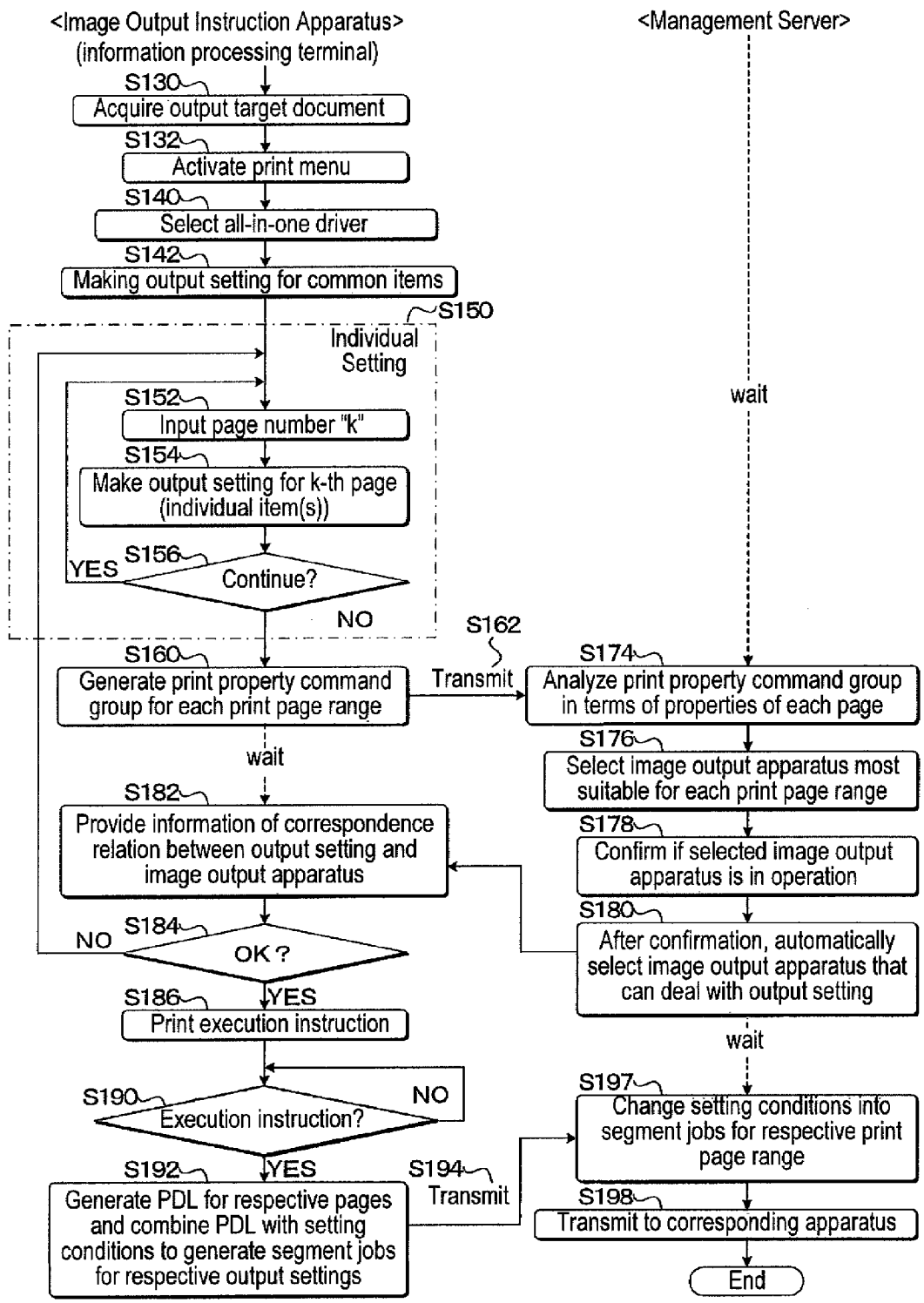
FIG. 4 is a flow chart showing an operation procedure in a mechanism of the basic example of the first exemplary embodiment.
Figure 4A:
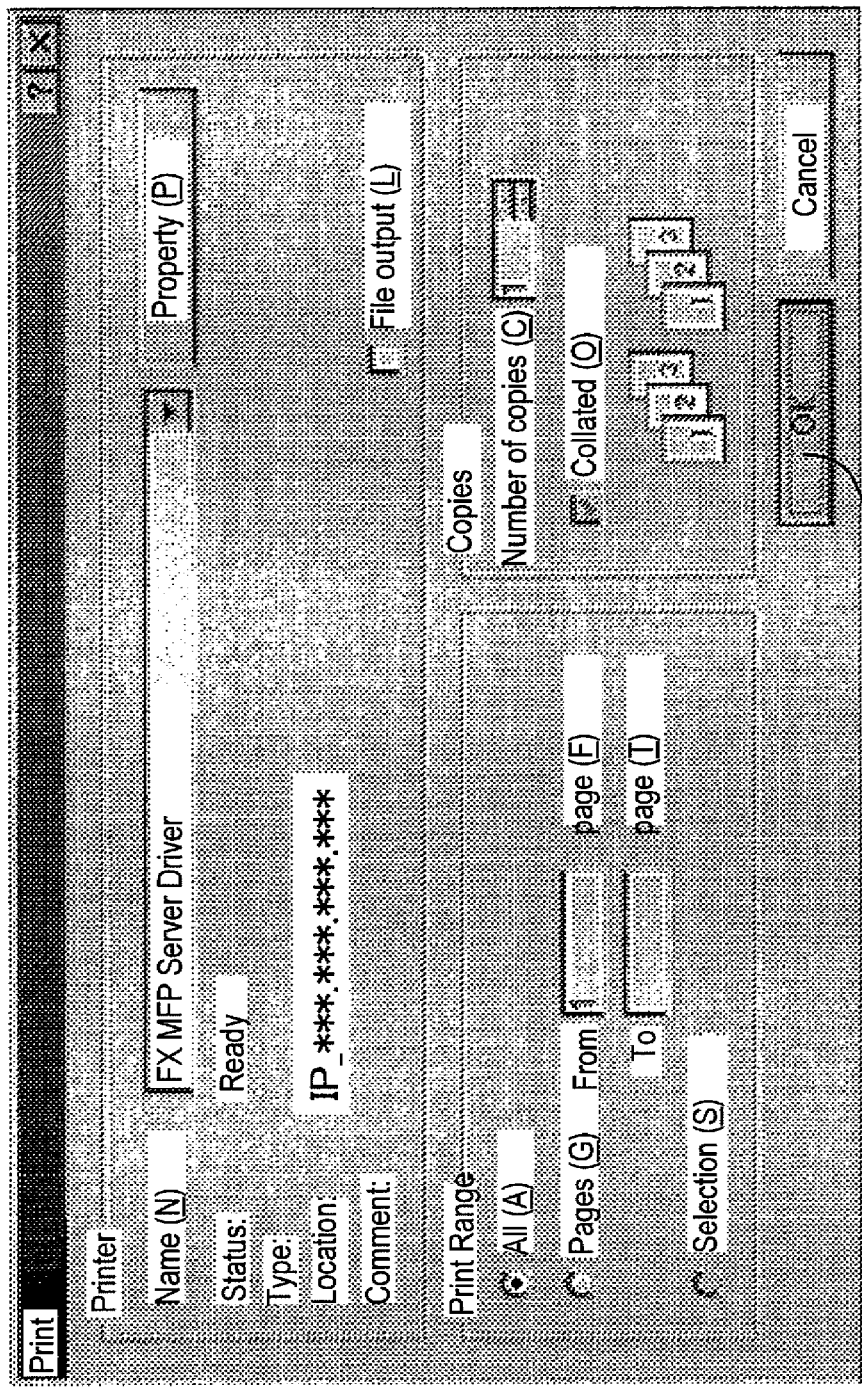
FIG. 4A is a diagram showing an example of a driver selection screen G132 (in S132)
Figure 4G:
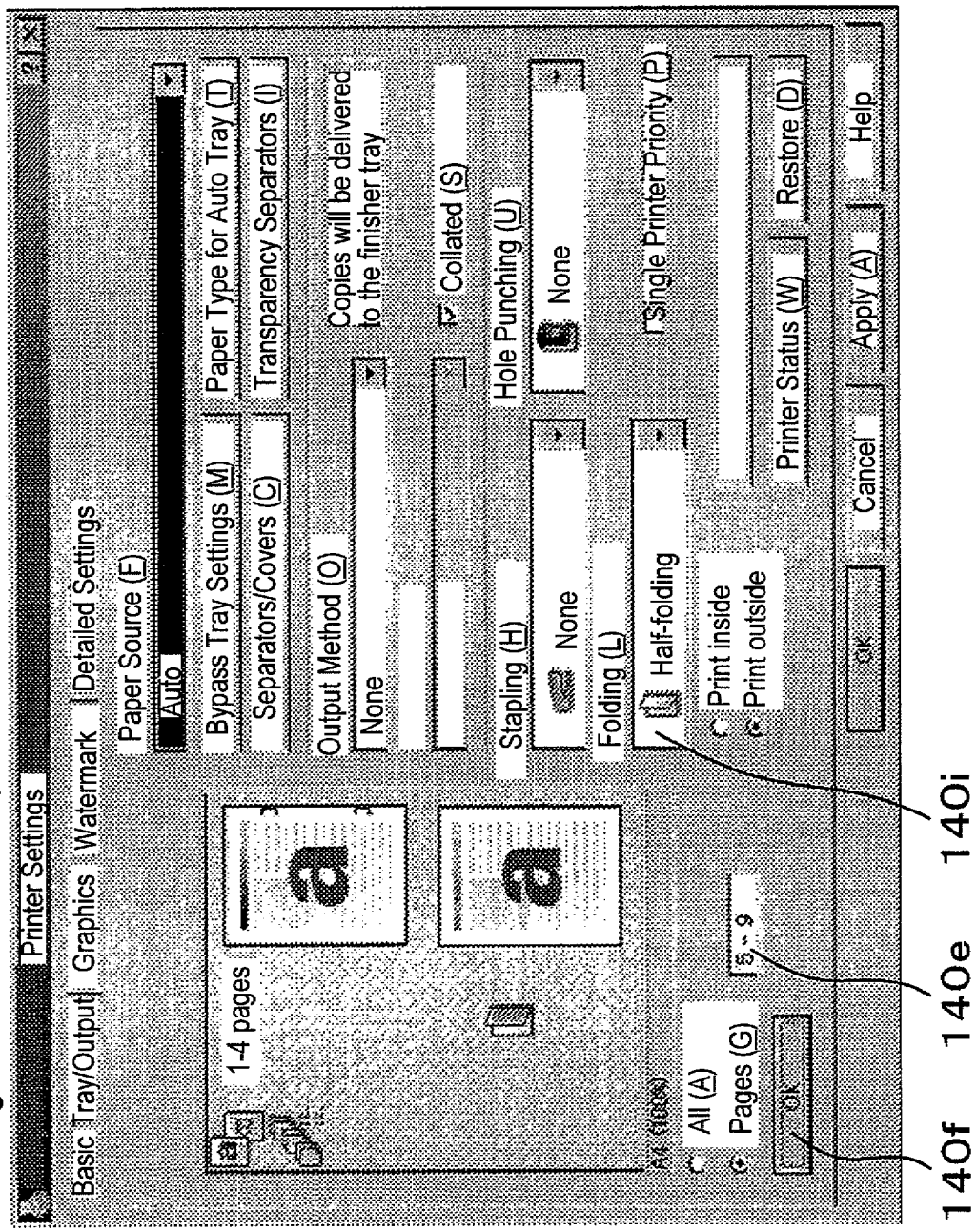
FIG. 4G is a diagram showing an example of the output setting screen G140 (in S150 and in S154)
Figure 4H:
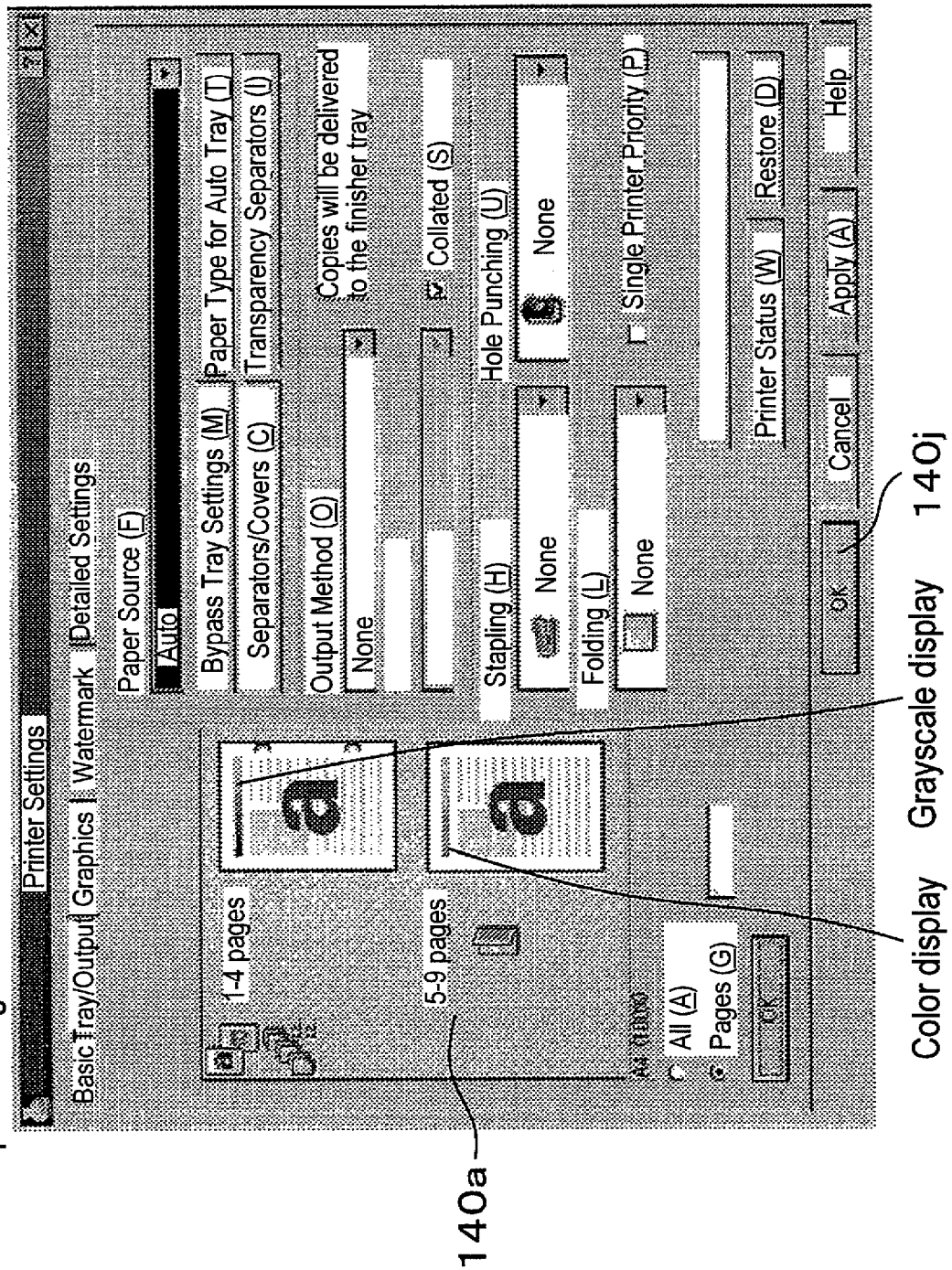
FIG. 4H is a diagram showing an example of the output setting screen G140 (in S150)
Figure 4I:
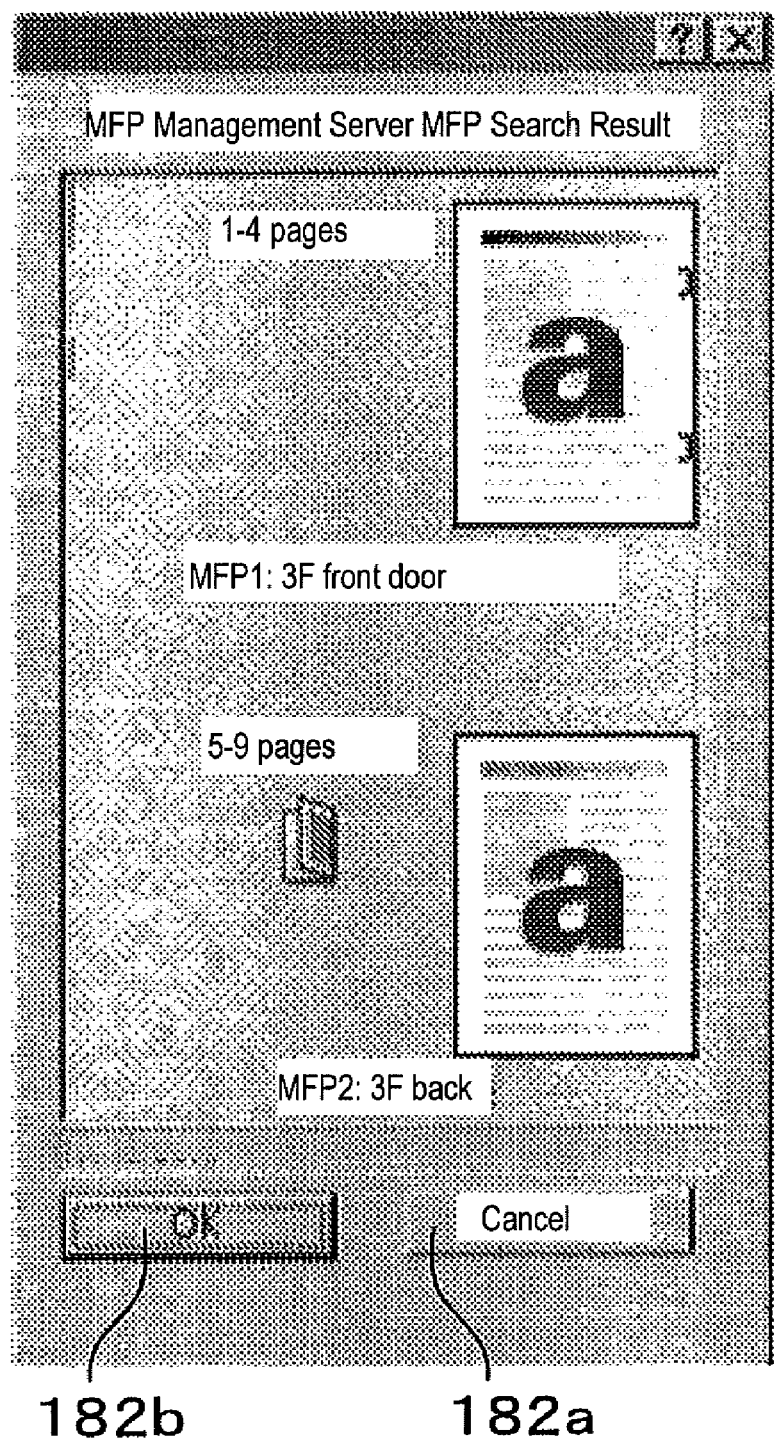
FIG. 4I is a diagram showing an example of a selection result screen G182 (in S182)

FIGS. 3 to 4I are diagrams for describing an operation procedure in a mechanism of the basic example of the first exemplary embodiment. In particular, FIG. 3 is a diagram for describing a functional outline of an all-in-one driver; FIG. 3A is a diagram showing a format example of the print property command group, which is generated by the print property command generation section 430 and transmitted to the management server 6 by the print property command transmission section 440; FIG. 3B is a diagram showing a format example of the output job, which is generated by the print job generation section 460 and transmitted to the management server 6 by the output job transmission section 470; and FIG. 3C is a diagram showing a format example of an output job (segment jobs for respective settings), which is transmitted to each image output apparatus 3X by the job analysis allocation section 670.

FIG. 4 is a flow chart for describing the operation procedure in the mechanism of the basic example of the first exemplary embodiment. In FIG. 4, the numbers in 100s are used to indicate the step numbers. The numbers in 10s and the single-digit numbers are used to specify process steps that are similar to or analogous to the process steps of the basic example shown in FIG. 1C. FIGS. 4 to 4I are diagrams each showing an example of a screen used in the operation procedure in the basic example of the first exemplary embodiment.

As shown in FIG. 3, the all-in-one driver basically generates an output job in the PDL format. Although the PDL specifications are different from one company to another, any PDL may be used in this exemplary embodiment. Based on function information of the respective image output apparatuses 3X managed by the cooperative process control section 600, the all-in-one driver displays apparatus functions of all types of the image output apparatuses 3X. Therefore, a core module used for this purpose makes reference to DDD (Device Dependent Description) files, in which the function information of the respective image output apparatuses 3X are described, by operating in cooperation with the cooperative process control section 600.

As shown in FIG. 4, in the image output instruction apparatus 2C provided in the information processing terminal 4, the image output control section 230 activates an application for a print document, and acquires an output target document (S130). Then, a print menu is activated by providing a print instruction through an operation menu on the application AP (S132). Then, the print property setting section 420 of the printing control section 400 presents a driver selection screen G132 as shown in FIG. 4A. A user selects an all-in-one driver on this driver selection screen G132 (S140). Then, this all-in-one driver presents a default output setting screen G140 as shown in FIG. 4B to the user.

In the output setting screen G140, tabs for basics, tray/output, graphics, watermarks/forms, and detailed settings are provided. Also, detailed setting items are provided for each tab. At the time when the default output setting screen G140 is displayed in step S140, each item is set to a default setting. For example, the default settings of the tray/output tab are as follows: tray selection is automatic, and finishing such as a stapling or a hole punching is not performed. The default settings of the graphics tab are as follows: black-and-white (which is not binary but is gray scale) is set as a color mode (color property).

Further, in the output setting screen G140 of this example, a setting outline display field 140a indicating an outline of a set print condition is provided for all the tabs. In this setting outline display field 140a, a print output image for each print page range is displayed. At the time when the default output setting screen G140 is displayed in step S140, an outline of each default print condition is displayed in the setting outline display field 140a. For example, a print page range, an outline of a finishing state for this print page range, and a thumbnail image of a standard manuscript are shown. The thumbnail image is shown so that black-and-white and color can be distinguished. Furthermore, in the output setting screen G140 of this example, even if an individual setting is made for each print page range, a "single printer priority" item 140b exists so that all printed matters can be acquired by the same image output apparatus.

On this output setting screen G140, the print property setting section 420 first receives user's setting of an output condition common to all pages (S142). The user clicks on an "all" radio button 140c, sets an output condition common to all pages, such as page decoration including page printing, a header and a footer, for example, and clicks on an OK button 140f close to a "pages" (page designation) radio button 140d. Thereafter, the process goes to a step of making an individual setting for each print page range desired to be output (S150).

When the process advances to the step of making an individual setting, the print property setting section 420 receives designation of a print page range desired to be output (S152), and user's setting of an output condition applied to this print page range (S154). When there exists another print page range desired to be output (e.g., if the answer is YES in S156), the process steps similar to those described above are repeated again for the other print page range. The designation of a print page range (S152) and the setting of the output condition applied to this print page range (S154) may be performed in no particular order.

For example, the description will be made on the assumption that for "1-4" pages, black-and-white (gray scale) and two right stapling positions are designated, and for "5-9" pages, color and half folding are designated. As shown in FIG. 4C, in the tray/output tab, the "pages" (page designation) radio button 140d is clicked, and "1-4" is input to an input field 140e located on the right side thereof to designate the print page range (1-4 pages) desired to be output. Thereafter, as shown in FIG. 4D, as a print condition for the "1-4" pages, two right stapling positions are designated in a stapling setting field 140g (pull-down menu). The default value of the color property is black-and-white (gray scale), and therefore, it is unnecessary for the user to designate the color property.

Upon completion of the print condition designation for the "1-4" pages, the user clicks on the OK button 140f close to the "pages" (page designation) radio button 140d. Then, as shown in FIG. 4E, "1-4 pages" is displayed, and an outline of the print conditions set for the "1-4" pages are displayed. The standard manuscript thumbnail image is displayed entirely in black-and-white multilevel tones so that it is noticeable that the image is in a black-and-white (gray scale) mode. In a part of the standard image thumbnail, a gray scale chart is shown.

Next, in order to make print condition settings for the print page range (5-9 pages) desired to be output, as shown in FIG. 4F, the process first goes to the graphics tab, and "color (automatic mode)" is selected in a color mode setting field 140h (pull-down menu). Moreover, as shown in FIG. 4G, the process goes back to the tray/output tab, "half folding" is selected in a folding setting field 140i (pull-down menu), and "5-9" is input to the page input field 140e. Upon completion of the print condition designation for the "5-9" pages, the user clicks on the OK button 140f close to the "pages" (page designation) radio button 140d. Then, as shown in FIG. 4H, "5-9 pages" is displayed, and an outline of the print conditions set for the "5-9" pages are additionally displayed in the setting outline display field 140a. In this example, there is shown a graphics mark indicating that half folding is set for the "5-9" pages, and furthermore, at least a predetermined portion of the standard manuscript thumbnail image is displayed in color so that it is noticeable that the image is in a color mode. For example, in a part of the standard image thumbnail, a color bar chart is shown.

Upon completion of the common setting and individual setting, the user clicks on a lowermost OK button 140j. When the print property setting section 420 has received this information (e.g., if the answer is NO in S156), the print property command generation section 430 generates a print property command group for each print page range, and sends the generated print property command group to the print property command transmission section 440 (S160). The print property command transmission section 440 transmits the print property command group generated for each print page range to the management server 6 (S162). In this example, the print property command transmission section 440 transmits the print property command group including (i) "the designation of black-and-white and two right stapling positions for the 1-4 pages" and (ii) "the designation of color and half folding for the 5-9 pages". FIG. 3A shows, for example, property group formats in PDL files, and they are transmitted to the management server 6. In this example, the PDL file is described in the PDL language. The same applied to the other PDL files described later.

In the cooperative process control section 600 of the management server 6, the per-setting suitable output apparatus selection section 660 receives the print property command group transmitted from the print property command transmission section 440 of the printing control section 400, and sends this print property command group to the property command analysis section 630. The property command analysis section 630 analyzes the print property command group transmitted from the information processing terminal 4 in terms of properties of each page, and sends the analyzed results to the suitable output apparatus selection section 640 (S174).

First, the suitable output apparatus selection section 640 selects, based on the function information (stored in a database) managed by the output apparatus function information acquisition section 610, an image output apparatus 3X most suitable for the print property designated for each print page range (S176). In this example, "an image output apparatus capable of performing a stapling function and gray scale printing" and "an image output apparatus capable of performing half folding and color printing" are searched for based on the database managed by the output apparatus function information acquisition section 610.

Furthermore, in cooperation with the output apparatus state confirmation section 620, the suitable output apparatus selection section 640 confirms as to whether or not each of the searched image output apparatuses 3X is currently in operation (S178). For example, the suitable output apparatus selection section 640 notifies the output apparatus state confirmation section 620 of the information on the image output apparatus 3X selected by the database search. The output apparatus state confirmation section 620 makes an inquiry to this image output apparatus 3X so as to determine as to whether or not it is currently in operation, and notifies the suitable output apparatus selection section 640 of the inquiry result. After the suitable output apparatus selection section 640 has confirmed that the selected image output apparatus 3X is currently in operation, the per-setting suitable output apparatus selection section 660 notifies the information processing terminal 4 of information indicating the result of the selection of the image output apparatus 3X most suitable for the output setting (print property) designated for each print page range (S180). If the selected image output apparatus 3X is not in operation, the second most suitable image output apparatus 3X being currently in operation is selected. If there is no such an image output apparatus, the user is notified that no image output apparatus 3X is available.

In the selection result information, information indicating the type name, location and the like of the selected image output apparatus is included. Further, when no operating image output apparatus 3X suitable for an output setting designated for a print page range is found, information indicating this fact is also included in the selection result information. In this example, MFP1 represents the type name of the image output apparatus suitable for the first combination, e.g., "the image output apparatus capable of performing a stapling function and gray scale printing", and MFP2 represents the type name of the image output apparatus suitable for the second combination, e.g., "the image output apparatus capable of performing half folding and color printing".

In the printing control section 400 of the information processing terminal 4, the output apparatus selection result display section 450 receives the device selection result information transmitted from the per-setting suitable output apparatus selection section 660, presents, based on this information, a selection result screen G182 as shown in FIG. 4I in which a combination of the image output apparatus 3X selected for print page range and the print property for the output setting of each print page range is shown, and requests the user to permit printing with this combination (S182).

On the selection result screen G182, similarly to the setting outline display field 140a of the output setting screen G140, a print page range, an outline of a finishing state for this print page range, and a thumbnail image of a standard manuscript, for example, are displayed so that a distinction can be made between the color mode and the black-and-white mode. Also, as information of the image output apparatus 3X suitable for the print setting for this print page range, the model number and location of the image output apparatus 3X, for example, are displayed.

On this selection result screen G182, the user confirms the combination of the image output apparatus 3X and the output setting for each print page range. If there is a problem, the user provides an instruction for this problem by clicking on a cancel button 182a. Upon receipt of this instruction by the all-in-one driver (e.g., if the answer is NO in S184), the print property setting section 420 goes back to the individual setting (S150), presents the output setting screen G140, and receives user's designation for making a setting again for this problematic print page range. On the other hand, if there is no problem (e.g., if the answer is YES in S184), the user clicks on an OK button 182b. Upon receipt of this instruction by the all-in-one driver, the process goes back to the driver selection screen G132 shown in FIG. 4A. The user provides a printing execution instruction by clicking on an OK button 132a on this driver selection screen G132 (S186).

Upon receipt of the printing execution instruction by the all-in-one driver (e.g., if the answer is YES in S190), the print job generation section 460 generates a print job using the all-in-one driver and transmits the generated print job to the output job transmission section 470 (S192). The output job transmission section 470 transmits the print job generated by the print job generation section 460 to the management server 6 (S194). The print job generation section 460 synthesizes (i) ID issued by the management server 6 and (ii) the PDL data, which is generated from the document data, to generate a single job file. A format of the print job is described in the PDL as shown in FIG. 3B, for example.

In the cooperative process control section 600 of the management server 6, the job analysis allocation section 670 receives the print job transmitted from the output job transmission section 470 of the printing control section 400. Based on the information indicating the result of the selection made by the per-setting suitable output apparatus selection section 660, the job analysis allocation section 670 changes (i) the print property command group, which has already been received from the print property command transmission section 440 by the per-setting suitable output apparatus selection section 660 and (ii) the single print job, received from the output job transmission section 470 into segment jobs for the respective print page ranges (images are combined for the respective pages) (S197), and allocates and transmits the segment jobs to the suitable image output apparatuses 3X, thereby providing the printing execution instructions to the respective image output apparatuses 3X (S198).

Each image output apparatus 3X executes printing based on the print instruction received from the job analysis allocation section 670 of the cooperative process control section 600. In this case, a format of the print job generated by the job analysis allocation section 670 is described in the PDL as shown in FIG. 3C, for example. The print instruction is generated and transmitted as plural output jobs for the respective print page ranges (segment jobs for respective settings).

In this example, the description has been made on the assumption that the image output apparatus 3X in charge of performing an output process is different for each print page range. However, assuming that the image output apparatus 3X capable of coping with the print settings for the respective print page ranges is found, the single image output apparatus 3X might be selected as a result of the automatic selection even if the "single printer priority" item 140b is not clicked. When the "single printer priority" item 140b is clicked, the single image output apparatus 3X capable of coping with all the print conditions individually set for a plurality of print page ranges is selected. In these cases, the job analysis allocation section 670 may generate segment jobs having the format shown in FIG. 3C, and may transmit the generated segment jobs for respective settings to the same image output apparatus 3X. In other words, similarly to the case of the two image output apparatuses, two continuous jobs may be provided. Alternatively, since there is virtually no need to allocate an output job to plural image output apparatuses, similarly to a third exemplary embodiment described later, a format of a print job generated by the job analysis allocation section 670 may be selected according to whether or not the image output apparatus 3X is "single job/single setting-permission".

<Functional Blocks: Modification Example of First Exemplary Embodiment>

Figure 5:
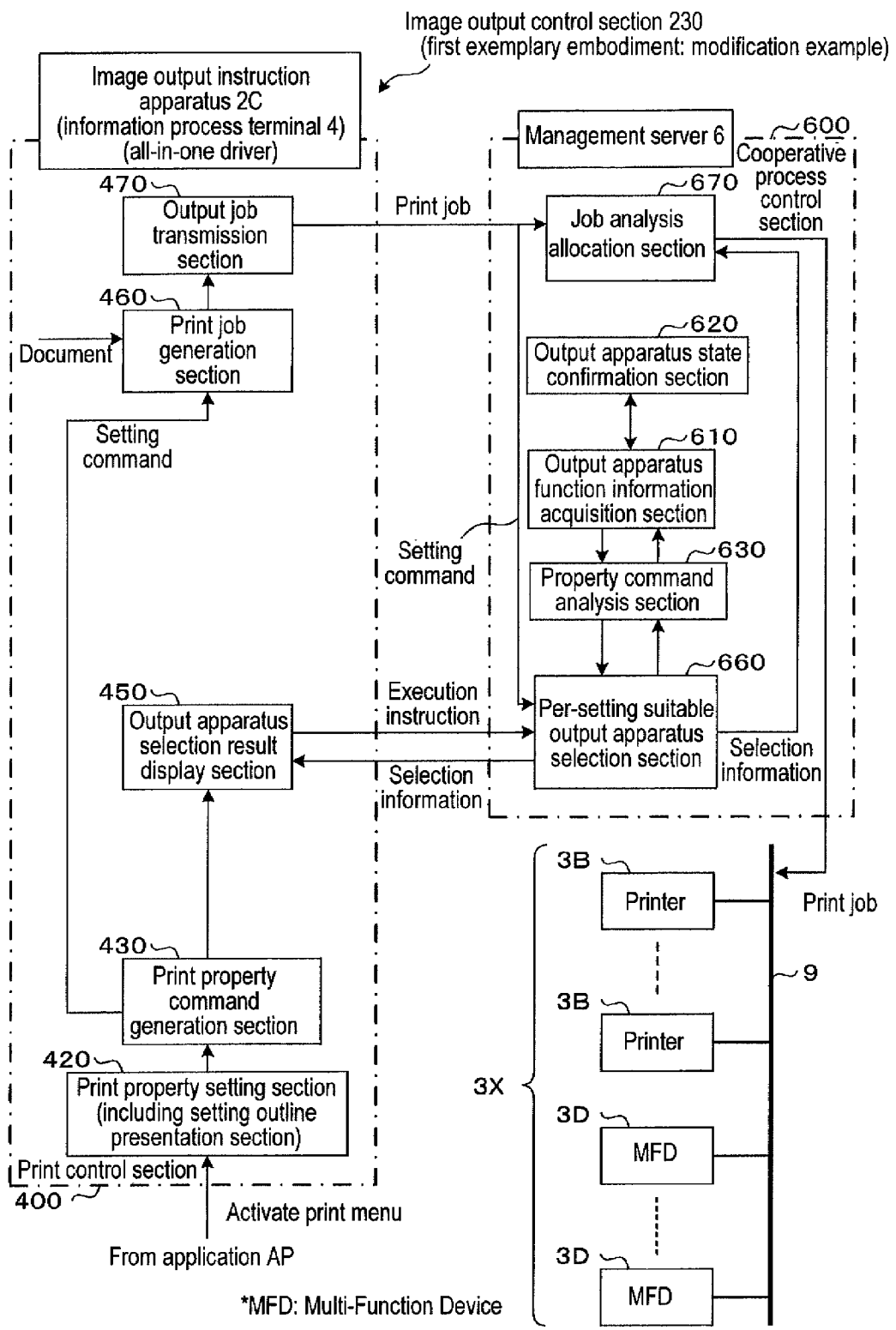
FIG. 5 is a block diagram for describing the image output setting control system and/or the image output setting control apparatus according to a modification example of the first exemplary embodiment.
Figure 5A:
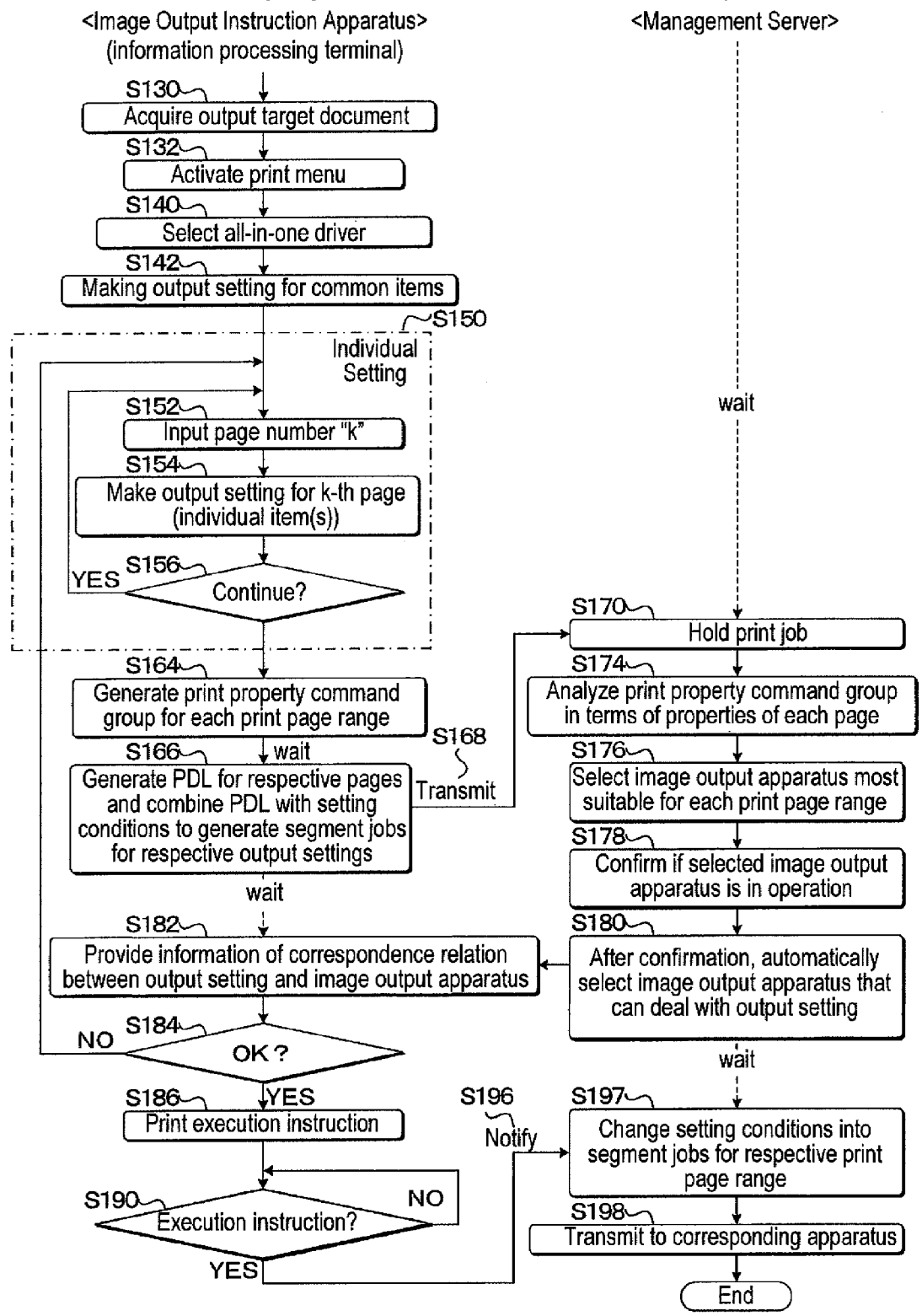
FIG. 5A is a flow chart showing an operation procedure in the modification example of the first exemplary embodiment.

FIG. 5 is a diagram for describing the image output setting control system 2A and the image output setting control apparatus 2B (e.g., the image output instruction apparatus 2C and the management server 6) according to a modification example of the first exemplary embodiment, and is a block diagram functionally showing a specific example of the image output control section 230. The system configuration applied to this modification example is similar to that shown in FIG. 3. FIG. 5A is a flow chart for describing an operation procedure in the modification example of the first exemplary embodiment. The numbers in 100s are used to indicate the step numbers. The numbers in 10s and the single-digit numbers are used to specify process steps that are similar to or analogous to the process steps of the basic example of the first exemplary embodiment shown in FIG. 4.

The modification example of the first exemplary embodiment is different from the basic example shown in FIG. 2A in that the printing control section 400 of the image output instruction apparatus 2C does not include the print property command transmission section 440. Further, a print property command group generated by the print property command generation section 430 is immediately sent to the print job generation section 460 without passing through the output apparatus selection result display section 450. An output job transmitted from the output job transmission section 470 to the management server 6 is sent not only to the job analysis allocation section 670 but also to the per-setting suitable output apparatus selection section 660.

Hereinafter, based on FIG. 5A, the operation procedure of the modification example of the first exemplary embodiment will be described with attention given to the differences between the modification example of the first exemplary embodiment and the basic example of the first exemplary embodiment. Upon receipt of an instruction of completion of common setting and individual setting by an all-in-one driver (e.g., if the answer is NO in S156), the print property command generation section 430 generates a print property command group for each print page range and sends the generated print property command group to the print job generation section 460 (S164). The print job generation section 460 generates a print job and sends the generated print job to the output job transmission section 470 (S166). The output job transmission section 470 transmits the print job generated by the print job generation section 460 to the management server 6 (S168). Although not shown, a format of the print job in this modification example may be PDL data including a portion indicating image information for each page and a portion indicating a print setting. In this modification example, the print job is generated and transmitted as a single job in which a print condition is set for each print page range.

In the cooperative process control section 600 of the management server 6, the per-setting suitable output apparatus selection section 660 and the job analysis allocation section 670 receive the print job transmitted from the output job transmission section 470. First, the job analysis allocation section 670 holds this print job in a storage medium (S170). On the other hand, the per-setting suitable output apparatus selection section 660 sends the print property command group in the print job to the property command analysis section 630. Thereafter, the process steps similar to those of the basic example of the first exemplary embodiment are performed until the step (S182) at which the selection result screen G182 is presented to request a user to permit printing with the presented combination.

If there is no problem in the selection result (e.g., if the answer is YES in S184), the user provides a printing execution instruction (S186). Upon receipt of the printing execution instruction by the all-in-one driver (e.g., if the answer is YES in S190), the output apparatus selection result display section 450 notifies the per-setting suitable output apparatus selection section 660 of the management server 6 of this information (S196).

In the cooperative process control section 600 of the management server 6, based on the information indicating the result of the selection made by the per-setting suitable output apparatus selection section 660, the job analysis allocation section 670 changes the single print job, which has been received from the output job transmission section 470 and is temporarily held, into segment jobs for the respective print page ranges (images are combined for respective pages) (S197), and allocates and transmits the generated segment jobs to the suitable image output apparatuses 3X, thereby providing the printing execution instructions to the image output apparatus 3X (S198). Each image output apparatus 3X executes printing based on the print instruction received from the job analysis allocation section 670 of the cooperative process control section 600. In this modification example, similarly to the format shown in FIG. 3C, a format of the print job generated by the job analysis allocation section 670 is provided for plural output jobs for the respective print page ranges (segment jobs for respective output settings).

In the modification example of the first exemplary embodiment, if the setting is made again in the course of determination of the output setting through the confirmation of the selection result, the generation of a print property command group by the print property command generation section 430 and the generation of a print job by the print job generation section 460 are repeated. However, the print job has already been transmitted to the management server 6 and held in the job analysis allocation section 670 (S170). Therefore, upon receipt of a printing execution instruction (e.g., if the answer is YES in S190), the job analysis allocation section 670 immediately changes the single print job into segment jobs for the respective print page ranges (images are combined for respective pages) without waiting for the completion of reception of the print job, and allocates and transmits the generated segment jobs to the appropriate image output apparatuses 3X. Hence, the time taken from the providing of the output execution instruction by the user (S186) until the completion of the output process will be shorter as compared with the basic example of the first exemplary embodiment.

<Functional Blocks: Second Exemplary Embodiment>

Figure 6:
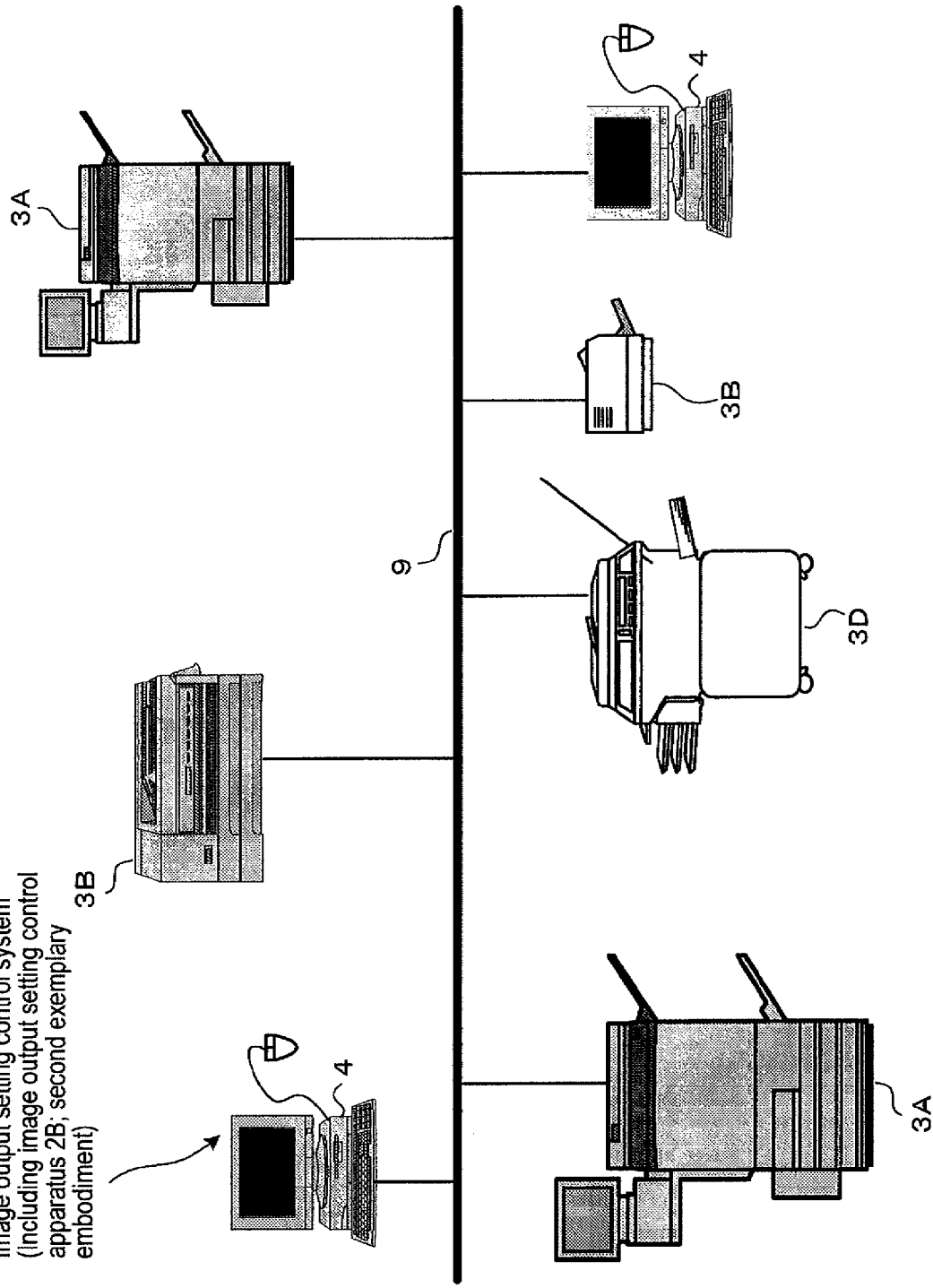
FIG. 6 is a diagram showing a configuration example of the image output setting control system suitable for a second exemplary embodiment.

FIG. 6 is a diagram for describing the image output setting control system 2A and the image output setting control apparatus 2B according to a second exemplary embodiment. In particular, FIG. 6 is a diagram showing a configuration example of the image output setting control system 2A according to the second exemplary embodiment. Although not shown, a format example of an output job transmitted to the image output apparatus 3X by the image output control section 230 may be have the format shown in FIG. 3B and FIG. 3C.

As shown in FIG. 6, the configuration of the second exemplary embodiment does not include the management server 6, and provides a configuration example suitable for the case where the single information processing terminal 4 having the image output setting control apparatus 2B and the plural image output apparatuses 3X (such as the printing device 3B and the multifunction device 3D) are connected via the network 9, and where the image output setting control apparatus 2B within the information processing terminal 4 issues an output instruction to the plural image output apparatuses 3X connected to the network 9. In other words, the configuration of the second exemplary embodiment provides an example of application of a distributed output system for processing a single output job by distributing it among the plural image output apparatuses 3X via no server.

In the second exemplary embodiment, the basic configuration shown in FIG. 3 can be applied to the image output setting control apparatus 2B as it is. Furthermore, the basic example shown in FIG. 4 can be applied to the operation procedure of the image output setting control apparatus 2B as it is. In the second exemplary embodiment, when a single output job is to be processed by the plural image output apparatuses 3X in a distributed manner in a state where the single image output setting control apparatus 2B can cope with the plural image output apparatuses 3X, the output condition reception section 250 (all-in-one driver) sets print conditions for print functions that include print functions of the plural image output apparatuses 3X connected via the network 9 (S40 to S56). Then, the image output control section 230 (output instruction section 270) transmits a print instruction, in which a print condition different for each print page range is set, to the image output apparatus 3X capable of executing printing in accordance with the print condition for each print page range (S90 to S98). In this exemplary embodiment, a format of the print job generated by the output instruction section 270 is one shown in FIG. 3C, that is, the print job generated by the output instruction section 270 are plural output jobs for the respective print page ranges (segment jobs for respective settings).

The image output apparatus 3X appropriate to the individual setting for each print page range is automatically selected by the image output control section 230, and a single output job to be processed is allocated to and processed by the selected image output apparatuses 3X. Therefore, in order to allows a user to confirm which of the image output apparatuses 3X performs the process, information identifying the image output apparatus(es) 3X in charge of performing the process may be presented to a user, and after user's confirmation, the process may be continued (S80 to S86).

<Functional Blocks: Third Exemplary Embodiment>

Figure 7A:
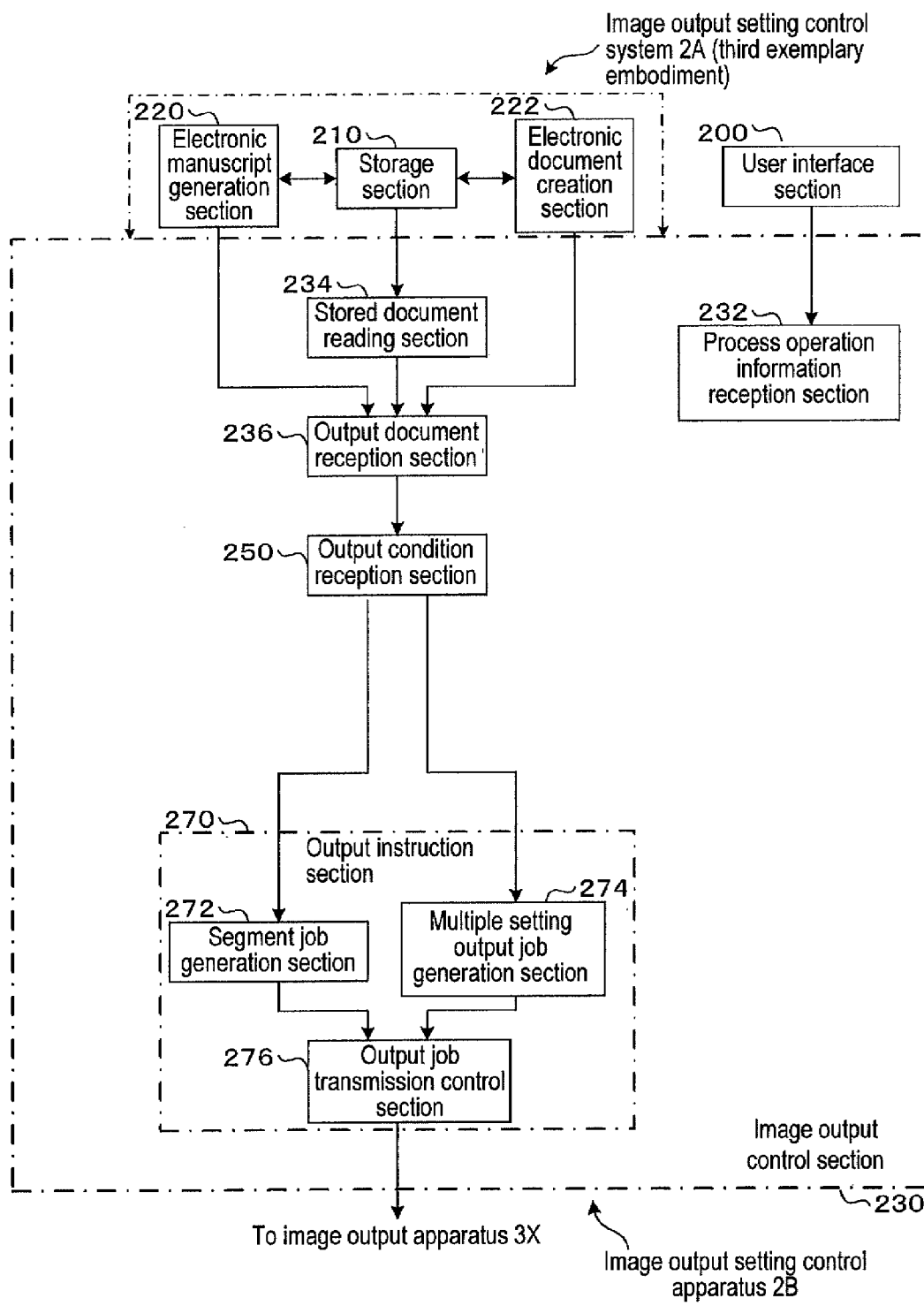
FIG. 7A is a block diagram functionally showing a specific example of an image output control section of the third exemplary embodiment.

FIGS. 7 and 7A are diagrams for describing the image output setting control system 2A and the image output setting control apparatus 2B according to the third exemplary embodiment. In particular, FIG. 7 is a diagram showing a configuration example of the image output setting control system 2A according the third exemplary embodiment; and FIG. 7A is a block diagram functionally showing a specific example of the image output control section 230 of the third exemplary embodiment.

The configuration of the third exemplary embodiment provides a configuration example suitable for the case where the single information processing terminal 4 provides an output process instruction to the single image output apparatus 3X (such as the printing device 3B and the multifunction device 3D). The configuration example, in which the single information processing terminal 4 provides an output process instruction to the single image output apparatus 3X, includes (i) the case where the management server 6 is not provided as shown in FIG. 7, and an output process instruction is provided to the specific single device among one or plural image output apparatuses 3X connected to the network 9 (alternatively, if the management server 6 is provided, an output process instruction is provided to the specific single device among one or plural image output apparatuses 3X connected to the network 9 without the output process instruction going through the management server 6) and (ii) the case where the information processing terminal 4 and the image output apparatus 3X_2 are connected on a one-to-one basis as indicated by the dashed line in the diagram.

In such a third exemplary embodiment, as mentioned at the end of the general outlines of the process procedure, the process of selecting an image output apparatus 3X most suitable for an output setting designated for each print page range, and requesting user's confirmation of the selection result becomes unnecessary. Therefore, with attention given to this point, a modification is also made to the configuration of the image output setting control apparatus 2B included in the information processing terminal 4. Specifically, as shown in FIG. 7A, the image output control section 230 of the image output setting control apparatus 2B of the third exemplary embodiment is configured by removing the output apparatus function information acquisition section 240, the setting outline presentation section 260, the suitable output apparatus selection section 264 and the output apparatus selection result presentation section 266 from the image output setting control apparatus 2B of the second exemplary embodiment similar to the basic configuration.

<Operation Procedure: Third Exemplary Embodiment>

Figure 8:
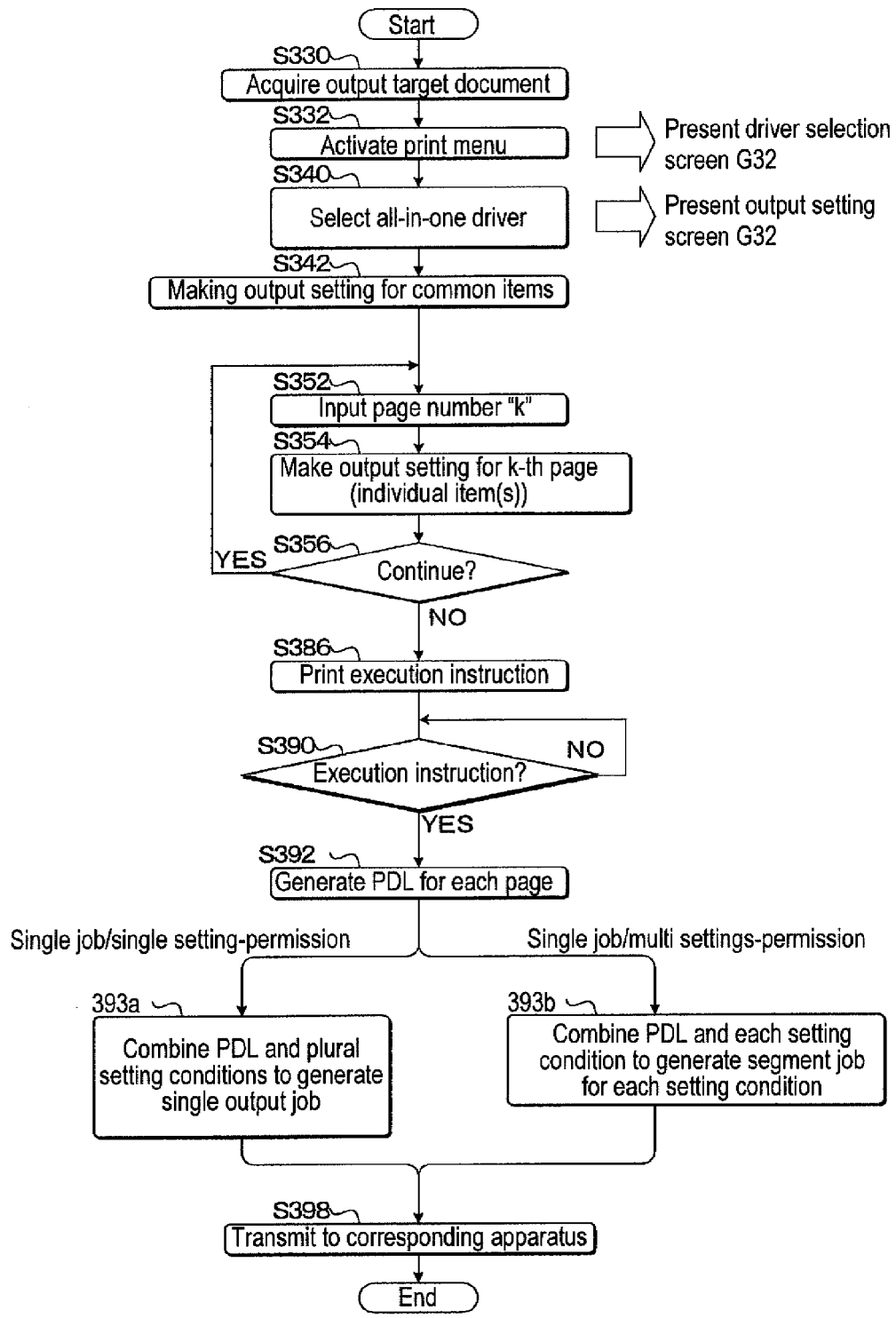
FIG. 8 is a flow chart showing an operation procedure in the third exemplary embodiment.
Figure 8A:
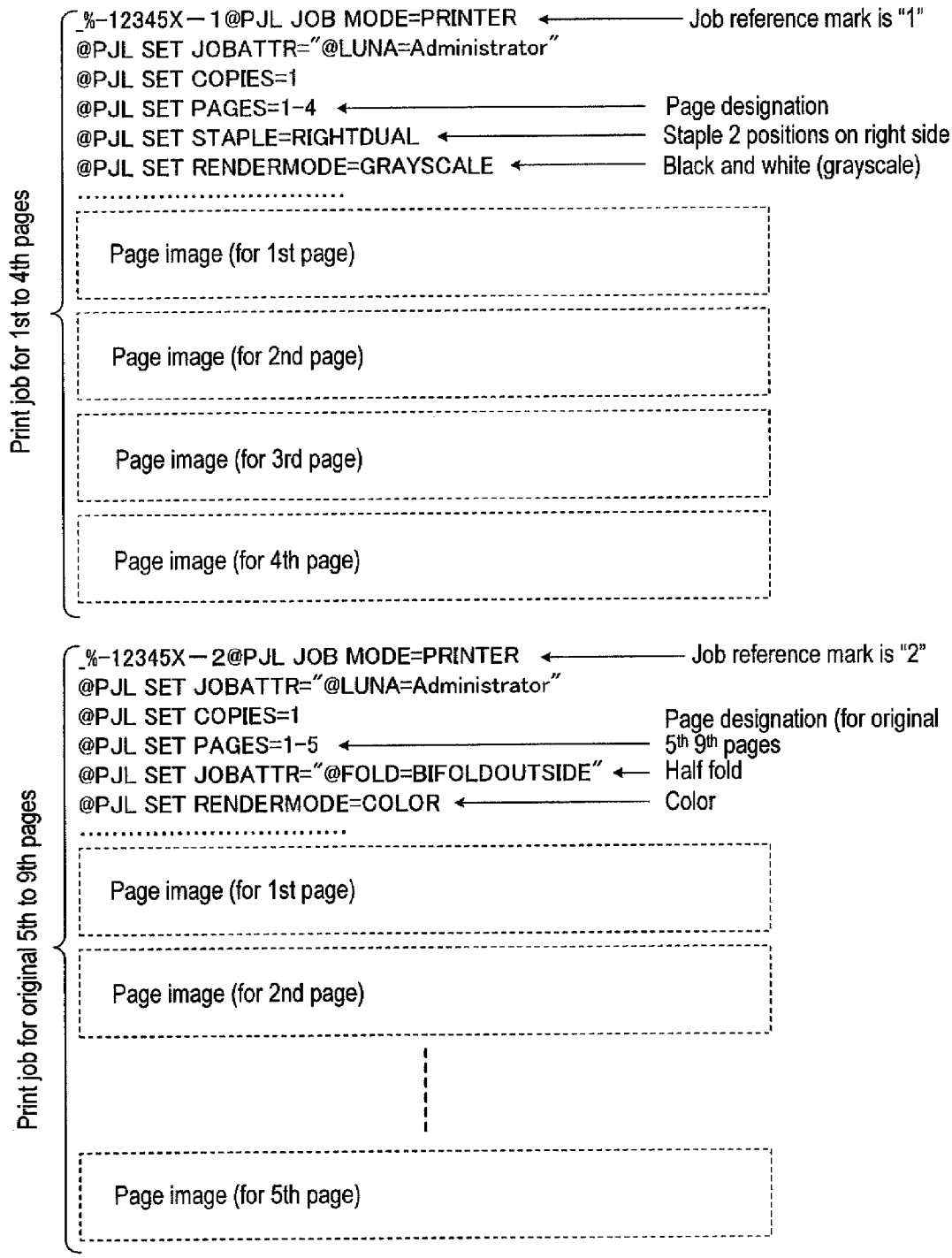
FIG. 8A is a diagram showing a format example of an output job to be transmitted to an image output apparatus by an output instruction section (in S393a) in the third exemplary embodiment.

FIG. 8 is a flow chart for describing an operation procedure in the third exemplary embodiment. The numbers in 300s are used to indicate the step numbers, and the numbers in 10s ands single-digit numbers are used to indicate process steps similar to or analogous to the process steps of the basic example shown in FIG. 1C. FIGS. 8A and 8B are diagrams each showing a format example of an output job to be transmitted to the image output apparatus 3X by the output instruction section 270.

In the third exemplary embodiment, it is unnecessary to incorporate an all-in-one driver into the image output control section 230. The process step of Step S80 is also unnecessary. In Step S84, an output job including a print condition individually set for each print page range is transmitted to the single image output apparatus 3X (including the image output apparatus designated by the user) (S398).

In the third exemplary embodiment, the image output setting control apparatus 2B transmits a print instruction, in which a print condition different for each print page range is set, to the single image output apparatus 3X. Therefore, the image output apparatus 3X at the reception side has to be capable of coping with the output job of this print instruction. For example, in the case of the "single job/single setting-permission" image output apparatus 3X as in the technique of the related art, a process is performed on the premise that a single print setting is made for a single job instruction. Therefore, in order to perform a printing process when individual settings for print page ranges are made for a single output job to be processed as in this example, it is necessary to employ a mechanism for generating segment jobs for respective output settings (S393a) and to issue an output instruction for each segment job. Speaking in the context of this example, it is necessary to transmit an output job by dividing it into plural output jobs for the respective print page ranges. In this case, a format of the print job generated by the output instruction section 270 is that shown in FIG. 8A. That is, the print job generated by the output instruction section 270 is plural output jobs for the respective print page ranges (segment jobs for respective output settings). In order to indicate that the original single output job (print job) is divided into plural jobs, reference marks ("-1" and "-2" in this example) are assigned to job names.

On the other hand, as the new "single job/multiple setting-permission" mechanism, the image output apparatus 3X itself may be configured to receive a single job in which a print condition is set for each print page range and perform an output process. In this case, a print instruction can be transmitted as a single output job in which a print condition is set for each print page range. The output instruction section 270 may generate a single output job, in which a print condition is set for each print page range, using the format shown in FIG. 8B, and may transmit the generated single output job (S393b).

Further, in the case of enabling a setting such as finishing, which is to be applied in common to all of plural print page ranges, the following points may be considered in regard to a format of an output job.

For example, in the case of FIG. 8A, if the similar stapling setting is made for each of the print job of 1-4 pages and the print job for 5-9 pages, both of the print jobs may be stapled and bound into one. Alternatively, as a setting concerning a stapling instruction, a print property command indicating that all the ranges should be bound into one may be added, thus allowing the image output apparatus, which has received an output job including such a print property command, to perform a process of binding all the ranges into one. In this case, if the output job includes no print property command indicating that all the ranges should be bound into one, or if the output job includes a print property command for carrying out binding of each print page range, a process of carrying out binding of each print page range may be performed.

In the mechanism of the third exemplary embodiment, since the single image output apparatus 3X performs an output process, no inconvenience occurs even if finishing is applied as a process common to all pages. For example, finishing common to all pages can also be applied to the first exemplary embodiment and the second exemplary embodiment. However, if the image output apparatus 3X in charge of performing an output process is different for each print page range, stapling on a apparatus-by-apparatus basis, for example, causes an unexpected resultant. Of course, also in the first exemplary embodiment and the second exemplary embodiment, such a situation may be avoided by clicking on the "single printer priority" item 140b on the output setting screen G140 so that all the resultants can be acquired by the same apparatus.

In the third exemplary embodiment, if print settings for respective print page ranges are made for a single output job, the single image output apparatus 3X performs a process with each print setting, and the application example thereof is not limited to the case where the single information processing terminal 4 (image output setting control apparatus 2B) and the single image output apparatus 3X are connected physically on a one-to-one basis, but may virtually be applied to the following cases in the similar manner. For example, the third exemplary embodiment can be applied to: the case where, when the apparatus actually used is selected by the image output setting control apparatus 2B in a state where the plural image output apparatuses 3X are available, the selection result indicates the single apparatus; and the case where a user designates the single image output apparatus 3X, which is desired to be used, even in a state where the plural image output apparatuses 3X are available.

<Image Output Setting Control Apparatus; Computer Configuration>

Figure 9:
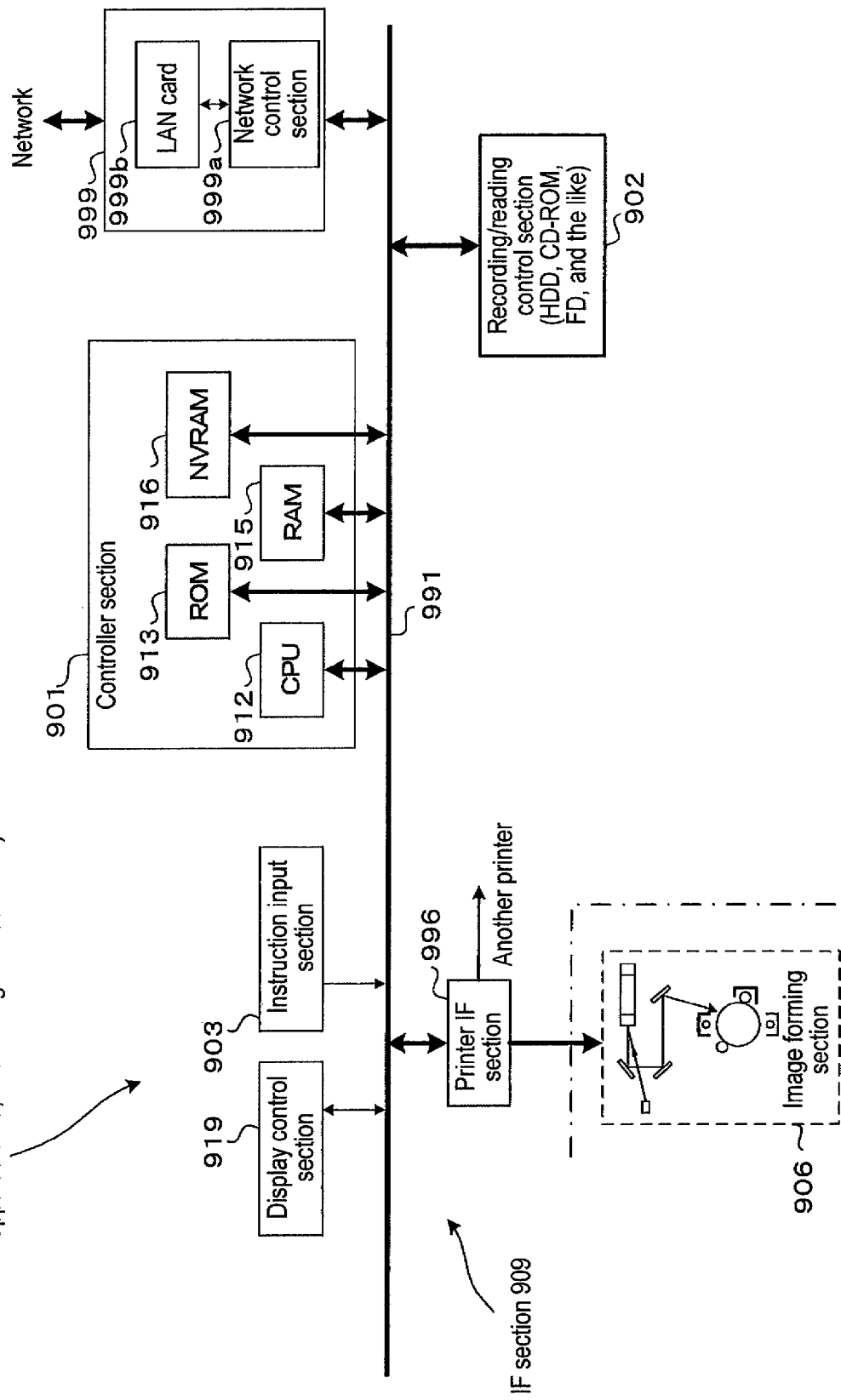
FIG. 9 is a diagram showing an example of the hardware configuration when the image output setting control apparatus, the image output instruction apparatus and the management server are implemented by electronic computers.

FIG. 9 is a block diagram showing another configuration example of the image output setting control apparatus 2B, the image output instruction apparatus 2C and/or the management server 6. In particular, FIG. 9 shows a more realistic hardware configuration that is created from a microprocessor or the like for executing an automatic editing process by means of software utilizing an electronic computer such as a personal computer.

Specifically, in this exemplary embodiment, a mechanism for receiving an output setting for each print page range from a user and performing an image output process (printing process) in accordance with an output condition for each print page range is not limited to a configuration created using a hardware processing circuit, but may be implemented by means of software using an electronic computer (computer) based on a program code for realizing these functions. In other words, in this exemplary embodiment, the mechanism of the image output control section 230 for receiving an output setting for each print page range and performing a central function for carrying out an image output process in accordance with an output condition for each print page range is not limited to a configuration created using a hardware processing circuit, but may be implemented by means of software using an electronic computer (computer) based on a program code for realizing these functions.

Hence, a program preferred in realizing a mechanism for performing an image output process based on an individual setting of an output condition for a single output job and each set output condition by means of software using an electronic computer (computer), or a computer-readable storage medium that stores this program may be extracted as an invention. By providing the mechanism for executing an image output process by means of software, there is achieved an advantage that an operation procedure and the like can be easily changed without hardware change.

If the electronic computer is allowed to execute, by means of software, the function of performing an image output process based on an individual setting of an output condition for a single output job and each set output condition, a program constituting this software is installed from a recording medium to, for example, a computer (such as an embedded microcomputer) incorporated into dedicated hardware, an SOC (System On a Chip) that realizes a desired system by providing functions such as a CPU, a logic circuit and a storage device on a single chip, or a general-purpose personal computer capable of executing various functions by installing various programs thereon.

The recording medium causes a state change of energy such as magnetism, light or electricity in a reading device included in the hardware resources of the computer in accordance with the descriptive contents of the program, and can transmit the descriptive contents of the program to the reading device in a signal format corresponding thereto. For example, the recording medium includes a package medium (portable storage medium), which is distributed to the user to provide the program separately from the computer, such as a magnetic disk (including a flexible disk (FD)) that records the program, an optical disk (including a CD-ROM (Compact Disc-Read Only Memory), and a DVD (Digital Versatile Disc)), a magneto-optical disk (including an MO (Magneto Optical Disk), or a semiconductor memory. In addition, the recording medium may include a ROM, a hard disk or the like which records the program and is provided to the user in a state in which it is incorporated into the computer in advance. Furthermore, the program constituting the software does not necessarily have to be provided via the recording medium, but may alternatively be provided via a wired or wireless communication network, for example.

For example, the similar effects as those in the case of the configuration created using a hardware processing circuit are achieved also in the case where the storage medium, which records the program code of the software for realizing the function of receiving an individual setting of an output condition for a single output job and the function of providing an image output instruction based on each set output condition, is supplied to a system or a device, and a computer (or a CPU or an MPU) of the system or the device reads and executes the program code stored in the storage medium. In this case, the program code itself read from the storage medium realizes the function of receiving an individual setting of an output condition for a single output job and the function of providing an image output instruction based on each set output condition.

Furthermore, the execution of the program code read by the computer realizes the function of receiving an individual setting of an output condition for a single output job and the function of providing an image output instruction based on each set output condition; in addition, OS (Operating Systems (basic software)) or the like operating on the computer performs a part of or the entire actual process based on an instruction of the program code, and the function of receiving an individual setting of an output condition for a single output job and the function of providing an image output instruction based on each set output condition may be realized by this process.

Moreover, the program code read from the storage medium may be written into a function expansion card inserted into the computer or a memory included in a function expansion unit connected to the computer, and thereafter, the function expansion card or a CPU and the like included in the function expansion unit may perform a part of or the entire actual process based on an instruction of this program code; thus, the function of receiving an individual setting of an output condition for a single output job and the function of providing an image output instruction based on each set output condition may be realized by this process.

It should be noted that the program is provided as a file in which there is described the program code for realizing the function of receiving an individual setting of an output condition for a single output job and the function of providing an image output instruction based on each set output condition; however, in this case, the program does not necessarily have to be provided as a batch program file, but may be provided as an individual program module in accordance with the hardware configuration of the system including a computer.

For example, a computer system 900 has: a controller section 901; and a recording/reading control section 902 for reading/recording data from/in a predetermined storage medium, such as a hard disk device, a flexible disk (FD) drive, a CD-ROM (Compact Disk ROM) drive, or a semiconductor memory controller.

The controller section 901 has: a CPU (Central Processing Unit) 912; a ROM (Read Only Memory) 913 serving as a read-only storage section; a RAM (Random Access Memory) 915 which is writable and readable whenever necessary and serves as an example of a volatile storage section; and a RAM 916 serving as an example of a non-volatile storage section (which will be described as an "NVRAM"). The ROM 913, the RAM 915, and the NVRAM 916 are controlled by a memory control section that is not shown.

It should be noted that the "volatile storage section" in the above description means a storage section formed so as to erase stored contents when the power of the device is turned off. On the other hand, the "non-volatile storage section" means a storage section formed so as to continue to retain stored contents even when the main power of the device is turned off. The non-volatile storage section may be any storage means as long as it can continue to retain stored contents, and is not limited to a semiconductor memory element which itself has non-volatility; alternatively, a volatile memory element may be configured so as to have "non-volatility" by providing a backup power supply.

Further, the non-volatile storage section does not necessarily have to be configured by a semiconductor memory element, but may be configured by utilizing a medium such as a magnetic disk or an optical disk. For example, a hard disk device can be utilized as the non-volatile storage section. Furthermore, a configuration in which information is read from a recording medium such as a CD-ROM may be employed, and may thus be utilized as the non-volatile storage section.

Besides, the computer system 900 has: an instruction input section 903 serving as a functional section that provides a user interface; a display output section 904 for presenting predetermined information such as a guidance screen during operation and/or a process result to a user; and an interface section (IF section) 909 that provides an interface function with each functional section. In the interface section 909, a user interface control section is incorporated.

Although not shown, as the instruction input section 903, for example, an operation key section of the user interface section may be utilized, or a keyboard and/or a mouse may be utilized. The display output section 904 includes a display control section 919 and a display device that is not shown. As the display device, for example, an operation panel section of the user interface section, which is not shown, may be utilized. Alternatively, the other display section including a CRT (Cathode Ray Tube), an LCD (Liquid Crystal Display) or the like may be utilized.

For example, the display control section 919 allows guidance information, an entire image captured by the computer system 900, and the like to be displayed on the operation panel section and/or the display section. Further, the display output section 904 may also be utilized as a display device in notifying a user of various pieces of information. It should be noted that the instruction input section 903 to which predetermined information is input using a fingertip or a pen may be configured by a display section having a touch panel on a display screen.

In addition to a system bus 991 serving as a transmission path of process data (including image data) and/or control data, the interface section 909 includes: an image forming section 906 for outputting a document onto a predetermined output medium (e.g., a print sheet); a printer IF section 996 that provides an interface function with the other printer; and a communication IF section 999 having a network control section 999a and a LAN card 999b through which passing of communication data with the network is mediated. In the printer IF section 996, a printing control section, which is not shown, is incorporated so as to control the image forming section 906.

In such a configuration, the CPU 912 controls the entire system via the system bus 991. The ROM 913 stores a control program and the like of the CPU 912. The RAM 915 includes an SRAM (Static Random Access Memory) or the like, and stores a program control variable and/or data and the like for various processes. Furthermore, the RAM 915 includes a region for temporarily storing data obtained by a computation performed in accordance with a predetermined application program, data acquired from the outside, and the like.

For example, a program for allowing the computer to execute the function of receiving an individual setting of an output condition for a single output job and the function of providing an image output instruction based on each set output condition is distributed through a recording medium such as a CD-ROM. Alternatively, this program may be stored in an FD instead of a CD-ROM. Further, an MO drive may be provided so that the above-mentioned program is stored in an MO, or the program may be stored in the other recording medium such as a non-volatile semiconductor memory card including a flash memory. Moreover, the program may be downloaded and acquired or may be updated from the other server or the like via a network such as the Internet.

It should be noted that as a recording medium for providing the program, in addition to an FD, a CD-ROM or the like, an optical recording medium such as a DVD, a magneto-optical recording medium such as an MO, a tape medium, a magnetic recording medium, and/or a semiconductor memory such as an IC card or a miniature card may be used. An FD or a CD-ROM serving as an example of the recording medium may store a part of or all of functions performed in realizing the function of receiving an individual setting of an output condition for a single output job and the function of providing an image output instruction based on each set output condition.

Furthermore, the hard disk device includes a region for storing data for various processes performed in accordance with a control program, and for temporarily storing a large amount of data acquired by the device itself, data acquired from the outside, or the like.

In such a configuration, in response to an instruction provided by an operator, an image output process (printing process) program (e.g., a so-called "printer driver") is installed in the RAM 915 from a readable recording medium such as a CD-ROM which stores a document editing program for executing a process of receiving an individual setting of an output condition for a single output job and a process of outputting an image based on each set output condition described above. And this printer driver is activated by an instruction provided by an operator or an automatic process.

In accordance with this print driver, the CPU 912 carries out a control computation process associated with the process of receiving an individual setting of an output condition for a single output job and the process of outputting an image based on each set output condition described above, stores data, which is being processed, in the storage device such as the RAM 915 and/or a hard disk, and outputs predetermined information (such as information of the output condition being set, and/or information of the image output apparatus 3X associated with the setting condition, for example) to the operation panel section or the display device such as a CRT or an LCD as necessary.

It should be noted that the image output setting control apparatus 2B is not limited to such a configuration using a computer; alternatively, the image output setting control apparatus 2B for performing the process of receiving an individual setting of an output condition for a single output job and the process of outputting an image based on each set output condition may be configured by a combination of dedicated hardware that provides a process of each functional section shown in FIG. 1A, FIG. 2A and/or FIG. 7A. For example, instead of performing the function of receiving an individual setting of an output condition for a single output job and the function of providing an image output instruction based on each set output condition entirely by means of software, a processing circuit for performing part of these functions by means of dedicated hardware may be provided.

A mechanism for performing these functions by means of software is capable of flexibly coping with parallel processing and consecutive processing; however, the processing time becomes long with increase in complexity of the processing, and a reduction in processing speed causes a problem. To the contrary, if the image output setting control apparatus is created using a hardware processing circuit, a speed-enhancement accelerator system capable of preventing a reduction in processing speed even if the processing is complicated and capable of obtaining high throughput is created.

<Image Output Apparatus>

Figure 10:
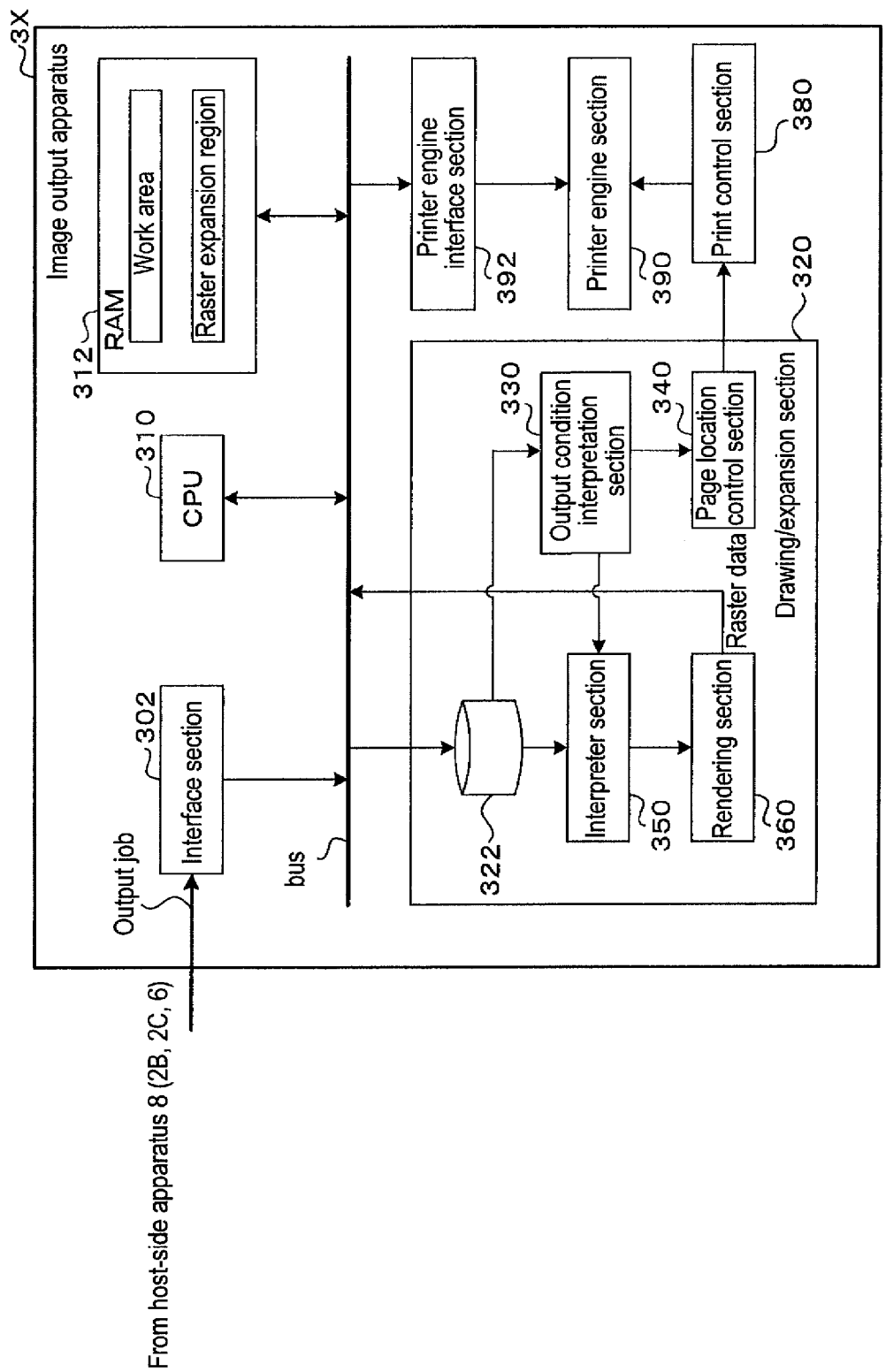
FIG. 10 is a block diagram showing a configuration example of a single job/multiple setting-permission image output apparatus.

FIG. 10 is a block diagram showing a configuration example of the image output apparatus 3X. The image output apparatus 3X shown in this diagram is not a single job/single setting-permission device in which only one type of an output setting is received in response to a single output execution instruction as in the technique of the related art, but is a device in which the new "single job/multiple setting-permission" mechanism is employed.

The image output apparatus 3X includes an interface section 302 that provides an interface function with the image output setting control apparatus 2B and/or the image output instruction apparatus 2C or the management server 6 (which will be also collectively referred to as a "host-side apparatus 8" below). The interface section 302 functions as a job reception section for receiving an output job transmitted from the host-side apparatus 8.

The image output apparatus 3X further includes: a CPU 310 for controlling operations of respective sections of the image output apparatus 3X via a system bus; a RAM 312 utilized by the CPU 310 or the like; a drawing/expansion section 320 for generating a page image for image output based on output job data received from the host-side apparatus 8; and a printing control section 380 for controlling a printing process based on the page image generated by the drawing/expansion section 320.

The drawing/expansion section 320 includes: a storage section 322 for storing an output job file received from the host-side apparatus 8; an interpreter section (drawing order interpretation section) 350 for interpreting a drawing order in the output job file input via the interface section 302; and a rendering section 360 serving as an example of an expansion processing section for expanding raster data based on data interpreted by the interpreter section 350. The rendering section 360 expands raster data on the RAM 312 when a drawing process is performed.

The image output apparatus 3X further includes a printer engine section 390 for executing a printing process in accordance with an instruction provided from the printing control section 380 of the drawing/expansion section 320. Between the printer engine section 390 and the system bus, a printer engine interface section 392 is provided.

The RAM 312 may also be utilized as a main memory used by the CPU 310 for controlling the entire image output apparatus 3X. In this case, a work area for the main memory is allocated to the RAM 312. The work area serves as a region temporarily used to operate a program. Furthermore, the RAM 312 may also be utilized as a memory for a drawing and expansion process in the rendering section 360. In this case, the RAM 312 is provided with a raster expansion area for the drawing and expansion process.

When printing is performed, the printing control section 380 activates the printer engine section 390, and supplies raster data (bitmap data), expanded on the RAM 312 by the rendering section 360, to the printer engine section 390. The printer engine section 390 forms an image on a sheet and outputs the image in accordance with the raster data supplied via the printer engine interface section 392.

In the invention, the drawing/expansion section 320 of this exemplary embodiment is characterized in that the drawing/expansion section 320 not only has the functions of receiving an output job premised on "single job/single setting" similarly to the technique of the related art, and drawing and expanding data for each page in accordance with a set output condition, but also has the functions of receiving an output job including a plurality of output settings in a single job, and drawing and expanding data for each page in accordance with each output condition set in the job.

With these functions, when an image is formed on a print sheet for each page, a drawing process is performed in accordance with each set output condition for each page even if respective items of output conditions (output settings), such as a basic setting, a layout setting, a page decoration setting and a finishing setting set at the host-side apparatus 8, are different for the respective output page ranges.

In order to realize these functions, the drawing/expansion section 320 of this exemplary embodiment is different from a "single job/single setting-permission" drawing/expansion section in the following points. For example, as particular functional sections for realizing the "single job/multiple setting-permission" function, the drawing/expansion section 320 has: an output condition interpretation section 330 for interpreting, for each setting, an output condition described in a header portion of a received output job; and a page location control section 340 for determining the page order by which pages should be located on a print sheet.

When received a "single job/multiple setting" output job, the output condition interpretation section 330 allocates the received output job for each page range of an output condition designated in the job, and passes the output job to the rendering section 360. Thus, the rendering section 360 can perform a drawing and expansion process similarly to the case of receiving a "single job/single setting" output job.

In performing a process of forming an image on a print sheet in the printer engine section 390 in cooperation with the printing control section 380, the page location control section 340 determines the process order based on the following criteria. For example, if the process is performed in a page order mode, the printer engine section 390 is controlled so that the process is performed based on the page order. Further, when all pages to be output are bound into one as in the case where a finishing process is performed using a staple, the printer engine section 390 is controlled so that the process is performed in the page order mode.

Furthermore, when the process is performed in a processing speed priority mode, the page order is ignored, and the process order is determined so that a printing process is performed for each print page range. At this time, the switching time for process conditions is also preferably taken into consideration. For example, in the case where the received output job includes a print page range for which a black-and-white mode is set, and a print page range for which a color mode is set, the print page range for which the black-and-white mode is set is processed first when the immediately preceding job is completed by a black-and-white process, and the print page range for which the color mode is set is processed first when the immediately preceding job is completed by a color process, thereby reducing the switching time. In either case, page rearrangement is to be performed by a user.

What is claimed is:

1. An image output setting control system comprising:
an output condition reception section that receives a setting of an output condition concerning an image output process;
a first output instruction section that provides an instruction so that an output process is performed in accordance with the output condition received by the output condition reception section; and
an image output apparatus that performs an output process in accordance with the instruction provided by the first output instruction section,
wherein the output condition reception section receives, for a single output instruction, an instruction input of an output condition different for each predetermined range, and
the first output instruction section provides an output instruction, in which an output condition different for each output range is set, to the image output apparatus in accordance with the output conditions for the respective predetermined ranges received by the output condition reception section, and
wherein an image output instruction apparatus provided with the output condition reception section; and
a management server provided with the first output instruction section, wherein
the image output instruction apparatus includes
an output condition notification section that notifies the output instruction section of information of the output conditions for the respective predetermined range received by the output condition reception section before notifying the management server of an output instruction, and
a second output instruction section,
when the output conditions for the respective predetermined range received by the output condition reception section are determined, the second output instruction section provides the output instruction, in which an output condition different for each output range is set, to the management server,
the management server includes
an output apparatus function information acquisition section that acquires, from plural types of image output apparatuses having different functions, function information of the respective image output apparatuses, the output apparatus function information acquisition section that manages the acquired function information, and
a suitable output apparatus selection section that selects one of the image output apparatuses being capable of executing a process in accordance with the output condition for each predetermined range, based on (i) the information of the output condition for each predetermined range notified by the output condition notification section and (ii) the function information managed by the output apparatus function information acquisition section, and upon receipt of the output instruction provided by the second output instruction section, the first output instruction section provides the output instruction to the image output apparatus selected for each output condition by the suitable output apparatus selection section.

2. An image output setting control system comprising:

an output condition reception section that receives a setting of an output condition concerning an image output process;

a first output instruction section that provides an instruction so that an output process is performed in accordance with the output condition received by the output condition reception section; and an image output apparatus that performs an output process in accordance with the instruction provided by the first output instruction section, wherein the output condition reception section receives, for a single output instruction, an instruction input of an output condition different for each predetermined range, and the first output instruction section provides an output instruction, in which an output condition different for each output range is set, to the image output apparatus in accordance with the output conditions for the respective predetermined ranges received by the output condition reception section, and wherein an image output instruction apparatus provided with the output condition reception section; and a management server provided with the first output instruction section, wherein the image output instruction apparatus includes a second output instruction section that provides an output instruction, in which an output condition different for each output range is set, to the management server based on the output conditions for the respective predetermined ranges received by the output condition reception section, the management server includes an output apparatus function information acquisition section that acquires, from plural types of image output apparatuses having different functions, function information of the respective image output apparatuses, the output apparatus function information acquisition section that manages the acquired function information, and a suitable output apparatus selection section that stores, in a storage section, information of the output instruction notified by the second output instruction section, the suitable output apparatus selection section that selects one of the image output apparatuses capable of executing a process in accordance with the output condition for each predetermined range, based on the information of the output condition for each predetermined range included in the output instruction, and upon receipt of an output execution notification from the image output instruction apparatus, the first output instruction section provides the output instruction to the image output apparatus selected for each output condition by the suitable output apparatus selection section.

3. An image output setting control system comprising:

an output condition reception section that receives a setting of an output condition concerning an image output process;

a output instruction section that provides an instruction so that an output process is performed in accordance with the output condition received by the output condition reception section; and an image output apparatus that performs an output process in accordance with the instruction provided by the output instruction section, wherein the output condition reception section receives, for a single output instruction, an instruction input of an output condition different for each predetermined range, and the output instruction section provides an output instruction, in which an output condition different for each output range is set, to the image output apparatus in accordance with the output conditions for the respective predetermined ranges received by the output condition reception section, and wherein an image output instruction apparatus provided with the output condition reception section and the output instruction section, wherein the image output instruction apparatus includes:

an output condition notification section that notifies the output instruction section of information of the output conditions for the respective predetermined range received by the output condition reception section; and an output apparatus function information acquisition section that acquires, from plural types of image output apparatuses having different functions, function information of the respective image output apparatuses, the output apparatus function information acquisition section that manages the acquired function information, wherein, the output instruction section includes a suitable output apparatus selection section that selects one of the image output apparatuses being capable of executing a process in accordance with the output condition for each predetermined range, based on (i) the information of the output condition for each predetermined range notified by the output condition notification section and (ii) the function information managed by the output apparatus function information acquisition section, and upon receipt of the output instruction provided by the second output instruction section, the output instruction section provides the output instruction to the image output apparatus selected for each output condition by the suitable output apparatus selection section.

* * * * *